United States Patent
Kobayashi et al.

(10) Patent No.: US 10,910,012 B1
(45) Date of Patent: Feb. 2, 2021

(54) MAGNETIC DISK DEVICE AND METHOD OF CONTROLLING THE SAME

(71) Applicants: Kabushiki Kaisha Toshiba, Tokyo (JP); Toshiba Electronic Devices & Storage Corporation, Tokyo (JP)

(72) Inventors: Manabu Kobayashi, Kawasaki Kanagawa (JP); Akihiro Yamazaki, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/804,181

(22) Filed: Feb. 28, 2020

(30) Foreign Application Priority Data

Aug. 21, 2019 (JP) .................. 2019-151438

(51) Int. Cl.
 *G11B 5/09* (2006.01)
 *G11B 20/18* (2006.01)
 *G11B 20/22* (2006.01)

(52) U.S. Cl.
 CPC .............. *G11B 20/18* (2013.01); *G11B 20/22* (2013.01)

(58) Field of Classification Search
 None
 See application file for complete search history.

(56) References Cited

U.S. PATENT DOCUMENTS

| | | | |
|---|---|---|---|
| 5,946,154 A * | 8/1999 | Ino | G11B 5/09 360/65 |
| 8,296,637 B1 | 10/2012 | Varnica et al. | |
| 8,438,458 B2 | 5/2013 | Lee | |
| 2004/0091069 A1* | 5/2004 | Liu | G11B 20/10037 375/350 |
| 2005/0122877 A1* | 6/2005 | Katayama | G11B 20/10111 369/59.22 |
| 2005/0144543 A1* | 6/2005 | Choi | H03M 13/6594 714/704 |
| 2009/0276685 A1* | 11/2009 | Yoshida | G11B 20/1833 714/769 |
| 2009/0307561 A1* | 12/2009 | Kanaoka | G11B 20/1866 714/752 |
| 2009/0327832 A1 | 12/2009 | Ichihara | |
| 2011/0107178 A1* | 5/2011 | Nakamura | G11B 20/1816 714/758 |
| 2016/0203041 A1* | 7/2016 | Galbraith | H03M 13/6325 714/769 |

* cited by examiner

*Primary Examiner* — Peter Vincent Agustin
(74) *Attorney, Agent, or Firm* — White & Case LLP

(57) ABSTRACT

According to one embodiment, a first decoding circuit calculates likelihood information by executing Viterbi decoding using a parameter for normalizing a branch metric on a signal sequence read from a magnetic disk. The second decoding circuit generates a first bit data sequence by iterative decoding using the likelihood information, and executes a check using a parity check matrix on the first bit data sequence. The control circuit causes the first decoding circuit and the second decoding circuit to repeatedly execute decoding, and updates the parameter in accordance with a check result obtained every time the decoding by the first decoding circuit and the second decoding circuit is executed. An acquisition circuit acquires numerical information corresponding to the number of bit errors included in the first bit data sequence obtained when the number of times of executions of the decoding is equal to a first value.

20 Claims, 15 Drawing Sheets

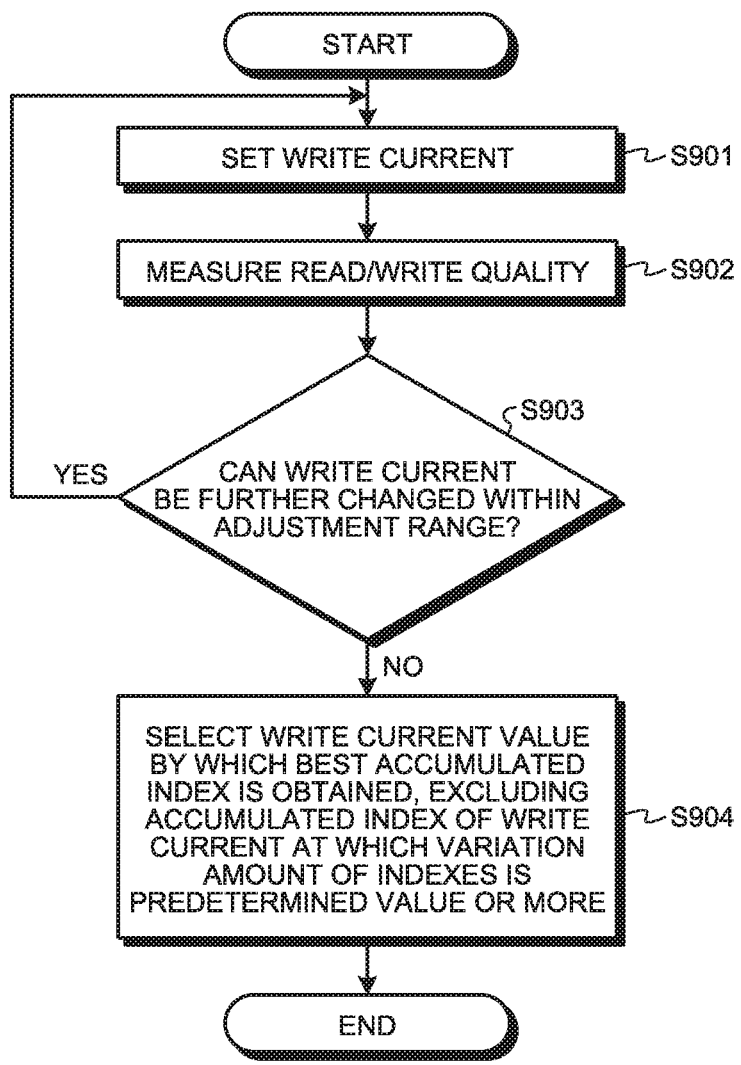

\# MAGNETIC DISK DEVICE AND METHOD OF CONTROLLING THE SAME

CROSS-REFERENCE TO RELATED APPLICATIONS

This application is based upon and claims the benefit of priority from Japanese Patent Application No. 2019-151438, filed on Aug. 21, 2019; the entire contents of which are incorporated herein by reference.

FIELD

Embodiments described herein relate generally to a magnetic disk device and a method of controlling the magnetic disk device.

BACKGROUND

In a magnetic disk device, it is necessary to confirm the read/write quality when optimizing the read/write conditions. Therefore, the measurement of the index correlated with the read/write quality is executed.

BRIEF DESCRIPTION OF THE DRAWINGS

FIG. 15 is a flowchart illustrating an example of details of the write current adjustment operation executed by the magnetic disk device according to the fourth embodiment.

DETAILED DESCRIPTION

According to the present embodiment, a magnetic disk device includes a first decoding circuit, a second decoding circuit, a control circuit, a storage circuit, a determination circuit, and an acquisition circuit. The first decoding circuit calculates likelihood information by executing Viterbi decoding using a parameter for normalizing a branch metric on a signal sequence read from a magnetic disk. The second decoding circuit generates a first bit data sequence by iterative decoding using the likelihood information, and executes a check using a parity check matrix on the first bit data sequence. The control circuit causes the first decoding circuit and the second decoding circuit to repeatedly execute decoding, and performs updating of the parameter in accordance with a check result obtained every time the decoding by the first decoding circuit and the second decoding circuit is executed. The determination circuit determines whether the number of times of executions of the decoding performed by the first decoding circuit and the second decoding circuit is equal to a first value. The acquisition circuit acquires numerical information corresponding to the number of bit errors included in a second bit data sequence that is a first bit data sequence obtained when the number of times is equal to the first value, and stores the acquired numerical information in the storage circuit.

Hereinafter, a magnetic disk device and a method according to embodiments will be described in detail with reference to the attached drawings. Note that the present invention is not limited by these embodiments.

First Embodiment

Figure 1:
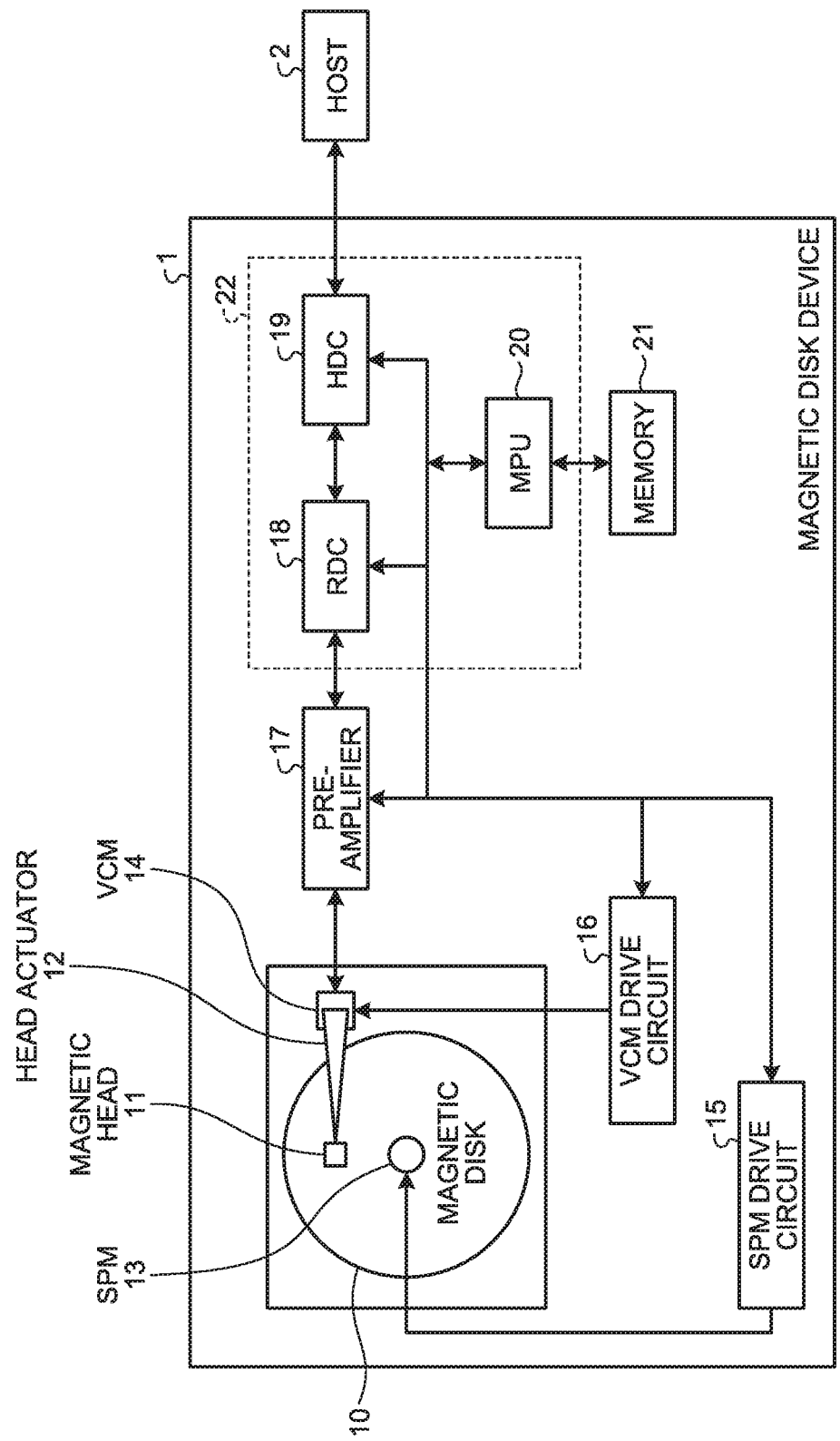
FIG. 1 is a schematic diagram illustrating an example of a configuration of a magnetic disk device according to a first embodiment.

FIG. 1 is a schematic diagram illustrating an example of a configuration of a magnetic disk device 1 according to a first embodiment. As illustrated in FIG. 1, the magnetic disk device 1 can be connected to a host 2. The host 2 is a computer device that issues a command for causing the magnetic disk device 1 to perform desired operation. The command includes a write command for writing data to the magnetic disk device 1 and a read command for reading data from the magnetic disk device 1, for example. The host 2 is a server, for example.

The magnetic disk device 1 includes a magnetic disk 10, a magnetic head 11, a head actuator 12, a spindle motor (SPM) 13, a voice coil motor (VCM) 14, an SPM drive circuit 15, and a VCM drive circuit 16, a preamplifier 17, a read channel (RDC) 18, a hard disk controller (HDC) 19, a microprocessor unit (MPU) 20, and a memory 21.

The magnetic disk 10 is a storage medium in which a magnetic layer is formed on an object such as a disk-shaped aluminum or glass substrate.

The SPM 13 rotationally drives the magnetic disk.

The head actuator 12 has a magnetic head 11 attached to the tip. The magnetic head 11 is supported by the head actuator 12 so as to face the recording surface of the magnetic disk 10.

The VCM 14 drives the head actuator 12. This enables the magnetic head 11 attached to the tip of the head actuator 12 to move relative to the recording surface of the magnetic disk 10.

The magnetic head 11 writes data to the magnetic disk 10 (more specifically, the magnetic layer of the magnetic disk 10) and reads data from the magnetic disk 10.

The SPM drive circuit 15 rotationally drives the SPM 13. The VCM drive circuit 16 drives the VCM 14.

The preamplifier 17 is an amplifier that amplifies a signal read from the magnetic disk 10 by the magnetic head 11 and a signal written to the magnetic disk 10.

The RDC 18 can encode data to be written to the magnetic disk 10 and can decode a signal read from the magnetic disk 10.

The MPU 20 comprehensively controls the operation of individual components in the magnetic disk device 1. The memory 21 is a rewritable storage medium storing firmware programs and data. The MPU 20 implements control on the basis of the firmware program stored in the memory 21, for example. The MPU 20 is an example of a processor.

The HDC 19 controls data exchanged between the magnetic disk device 1 and the host 2.

The RDC 18, HDC 19, and MPU 20 are mounted on a control circuit board 22. The components mounted on the control circuit board 22 are not limited to these.

Figure 2:
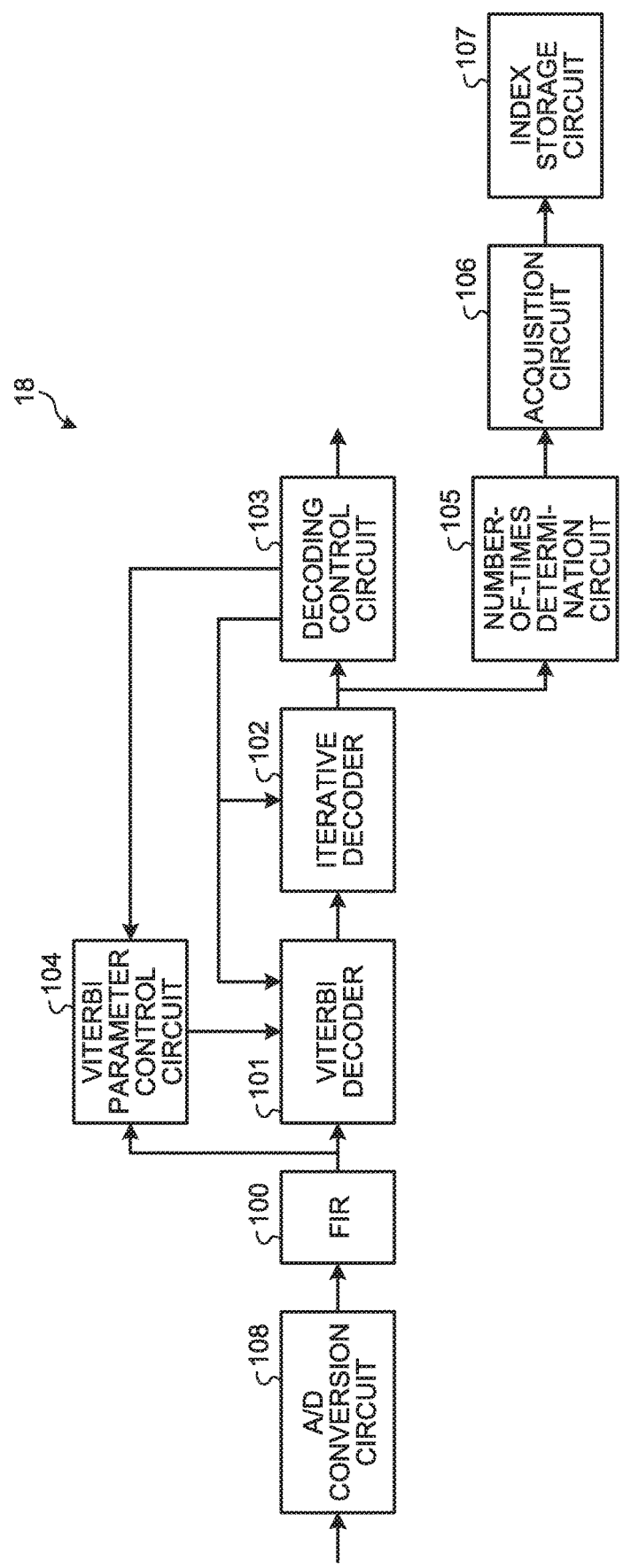
FIG. 2 is a schematic diagram illustrating an example of a detailed configuration of a read channel (RDC) according to the first embodiment.

FIG. 2 is a schematic diagram illustrating an example of a detailed configuration of the RDC 18 according to the first embodiment. The RDC 18 includes an analog-to-digital (A/D) conversion circuit 108, a finite impulse response (FIR) filter 100, a Viterbi decoder 101, an iterative decoder 102, a decoding control circuit 103, a Viterbi parameter control circuit 104, a number-of-times determination circuit 105, an acquisition circuit 106, and an index storage circuit 107.

The Viterbi decoder 101 is an example of a first decoding circuit. The iterative decoder 102 is an example of a second decoding circuit. The decoding control circuit 103 and the Viterbi parameter control circuit 104 are examples of a control circuit. The index storage circuit 107 is an example of a storage circuit. The number-of-times determination circuit 105 is an example of a determination circuit.

A signal (reproduction signal) read by the magnetic head 11 is input to the A/D conversion circuit 108 via the preamplifier 17. Thereafter, the reproduction signal is A/D converted by the A/D conversion circuit 108 and then input to the FIR filter 100.

The FIR filter 100 is a waveform equalizer that makes a reproduction signal from the magnetic head 11 conform to a partial response (PR) characteristic to be used. Amplification of noise components due to equalization is suppressed by selecting the PR characteristic similar to the reproduction signal characteristic of the magnetic disk 10 as a target PR characteristic. The waveform equalizer equalizes the reproduction signal to a response waveform (partial response waveform signal) corresponding to the target PR characteristic (PR class). This generates a waveform signal sequence in which each of symbols is represented as a wave height, that is, a level. The waveform signal sequence obtained in this manner will be referred to as a sample data sequence.

The Viterbi decoder 101 performs Viterbi decoding on the sample data sequence output from the FIR filter 100 and thereby calculates likelihood information.

The Viterbi decoding procedure includes branch metric calculation, path metric calculation, path metric comparison, and survivor path selection. For example, the branch metric is a square error between an expected value of a level (data bit level) prepared for each of data patterns having a predetermined length (for example, three symbols) and a level of a symbol included in the sample data sequence. The path metric is an accumulation of branch metrics. The path with the smallest path metric is defined as a maximum likelihood sequence.

Here, the Viterbi decoder 101 outputs likelihood information. The likelihood information is information indicating reliability of the maximum likelihood sequence for each of symbols. In one example, the likelihood information is a square error obtained for each of symbols.

The sample data sequence might include noise. The noise is not limited to random noise. Therefore, the Viterbi decoder 101 executes branch metric normalization when performing Viterbi decoding. For example, the Viterbi decoder 101 divides a square error between the average value of the levels and the level included in the sample data sequence by a value corresponding to standard deviation of the levels, and thereby normalizes the square error. With this processing, it is possible to obtain a branch metric in a case where it is assumed that the noise included in the sample data sequence is random noise. Normalizing the branch metric improves Viterbi decoding accuracy.

The value corresponding to the standard deviation of the levels is an example of a parameter for normalizing the branch metric. The parameter for normalizing the branch metric may include an average value of the levels. The parameter for normalizing the branch metric may include a weighting coefficient to be multiplied to each of pieces of bit data of the predetermined length data.

A parameters for normalizing the branch metric is prepared for each of the data patterns having a predetermined length. Hereinafter, the parameter for normalizing the branch metric will be referred to as a Viterbi parameter.

The Viterbi parameter control circuit 104 updates a Viterbi parameter. More specifically, the Viterbi parameter control circuit 104 performs Viterbi parameter learning on the basis of a relationship between the sample data sequence and a bit data sequence obtained by the iterative decoder 102, which will be described below, and updates the set value of the Viterbi parameter to the value obtained from the learning result.

The iterative decoder 102 performs iterative decoding on the basis of the likelihood information output from the Viterbi decoder 101, and generates a bit data sequence corresponding to the sample data sequence. The iterative decoder 102 also executes a check using a parity check matrix on the bit data sequence and calculates the number of violations of the parity check expressions.

As a method of iterative decoding performed by the iterative decoder 102, any method using a belief propagation algorithm may be employed. In one example, Low Density Parity Check (LDPC) may be employed as iterative decoding performed by the iterative decoder 102.

Figure 3:
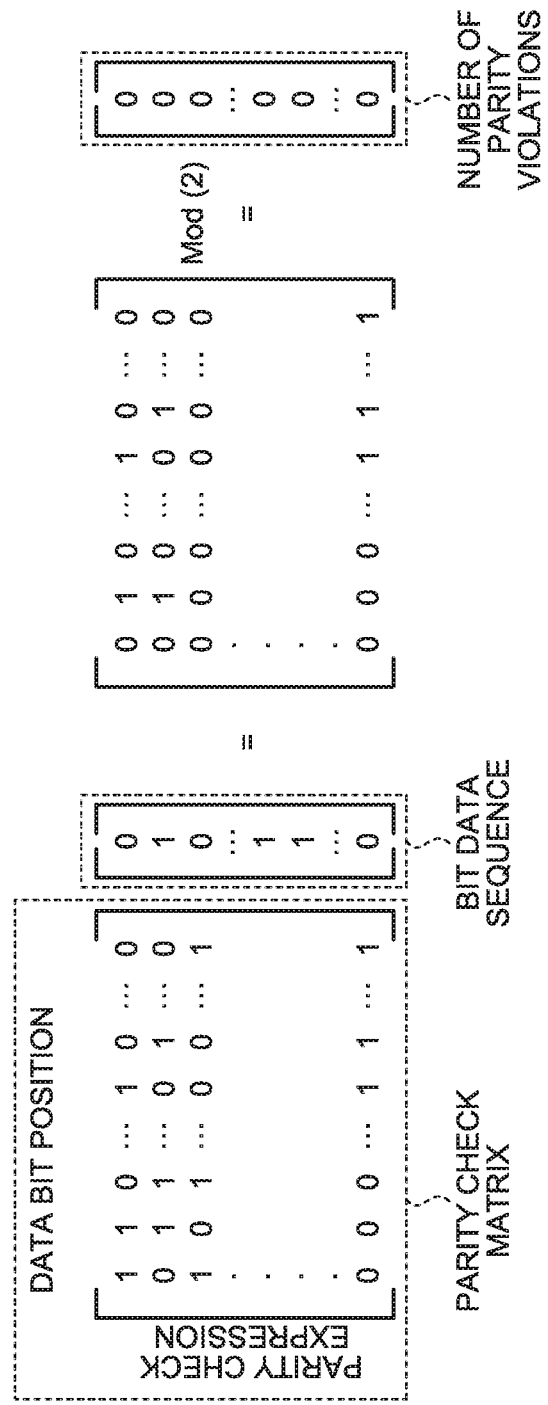
FIG. 3 is a diagram illustrating a method of calculating the number of violations of parity check expressions using a parity check matrix according to the first embodiment.

FIG. 3 is a diagram illustrating a method of calculating the number of violations of parity check expressions using a parity check matrix according to the first embodiment.

A parity check matrix H is a matrix having data bit positions including parity bits as columns and parity check expressions as rows. A remainder by modulo 2 is calculated for each element of the sequences obtained by multiplying the parity check matrix H from the right by the bit data sequence. The number of violations of the parity check expressions is calculated from the sequences obtained by the calculation. Hereinafter, the number of violations of the parity check expressions will be expressed as the number of parity violations.

Now, description will continue by returning to FIG. 2. The decoding control circuit 103 controls repetition of Viterbi decoding and iterative decoding on the basis of the number of parity violations obtained as a result of the check using the parity check matrix.

The decoding control circuit 103 also determines whether to execute Viterbi parameter learning on the basis of the number of parity violations. In a case where the decoding control circuit 103 determines to execute Viterbi parameter learning, the decoding control circuit 103 instructs the Viterbi parameter control circuit 104 to execute the learning.

In a case where the decoding passed the check using the parity check matrix, that is, in a case where the number of parity violations is 0, the decoding is estimated to have been successful. Accordingly, the decoding control circuit 103 transmits the bit data sequence generated by the iterative decoder 102 to the subsequent processing circuit. An example of the subsequent processing circuit is a demodulator.

The number-of-times determination circuit 105 determines whether the number of times Viterbi decoding and iterative decoding have been executed is equal to an index storage slice which is preliminary set. The index storage slice is set by the MPU 20, for example. Note that the index storage slice may be fixed, or may be changed depending on the situation by the MPU 20 or the like. Hereinafter, the number of times Viterbi decoding and iterative decoding have been executed will be referred to as the number of times of executions of decoding. The index storage slice is an example of a first value in the first embodiment.

In a case where the number of times of executions of decoding is equal to the index storage slice, the acquisition circuit 106 acquires an index indicating the read/write quality and stores the acquired index in the index storage circuit 107.

Certain numerical information may be employed as an index indicating the read/write quality so long as it has a strong correlation with the sector error rate.

For example, the number of bit errors included in the bit data sequence acquired when the number of times of executions of decoding is equal to the index storage slice is considered to be correlated with the sector error rate of the sector that stores the bit data sequence. Therefore, the number of bit errors included in the bit data sequence acquired when the number of times of executions of decoding is equal to the first value may be employed as the index.

Specifically, for example, the acquisition circuit 106 stores, in a predetermined register or the like, a bit data sequence that is obtained before being written to the magnetic disk 10 and that does not include an error. The acquisition circuit 106 then calculates an exclusive OR of the bit data sequence stored in the register and the bit data sequence generated by the iterative decoder 102 when the number of times of executions of decoding is equal to the index storage slice. Subsequently, the acquisition circuit 106 can acquire the number of bit errors described above by accumulating error bits determined by the exclusive OR operation Furthermore, the number of parity violations calculated when the number of times of executions of decoding is equal to the index storage slice is also considered to be correlated with the sector error rate of the sector that stores the bit data sequence. The number of parity violations calculated when the number of times of executions of decoding is equal to the index storage slice may be employed as the index.

For example, the acquisition circuit 106 can acquire, as the index, the number of parity violations calculated by the iterative decoder 102 when the number of times of executions of decoding is equal to the index storage slice.

In a case where the read/write quality is low, the number of bit errors or the number of parity violations to be obtained is large. Conversely, in a case where the read/write quality is high, the number of bit errors or the number of parity violations to be obtained is small. That is, the number of bit errors and the number of parity violations acquired as described above may be used as the index representing the read/write quality.

In a case where the decoding is successful, the number of error bits and the number of parity violations will both be 0 even when the read/write quality is low. That is, after successful decoding, an index corresponding to the read/write quality cannot be obtained. In the embodiment, the number of error bits or the number of parity violations is acquired in the middle of repeatedly executed decoding regardless of whether decoding is successful in the end. Therefore, it is possible to obtain a quantitative value corresponding to the read/write quality even when decoding is successful in the end.

Each of the number of bit errors included in the bit data sequence and the number of parity violations is an example of numerical information corresponding to the number of bit errors included in the bit data sequence.

Here, as an example, the acquisition circuit 106 executes index acquisition for each of predetermined storage regions, and stores a cumulative value of the acquired indexes in the index storage circuit 107. That is, for example, when the acquisition circuit 106 acquires an index from the first storage region, the acquisition circuit 106 stores the index in the index storage circuit 107. When the acquisition circuit 106 newly acquires an index from the subsequent storage region, the acquisition circuit 106 adds the newly acquired index to the index (or the cumulative value of the indexes) stored in the index storage circuit 107, and updates the content of the index storage circuit 107 to the value obtained by the addition.

An example of the predetermined storage region is a sector. However, the predetermined storage region is not limited to a sector.

The method for storing the index is not limited to the above. The acquisition circuit 106 may update the content of the index storage circuit 107 by overwriting with the index acquired for each of the predetermined storage regions.

The index storage circuit 107 includes a small-scale memory device or a register, for example. The index stored in the index storage circuit 107 is read by the MPU 20, for example. The MPU 20 can provide the index to control read/write conditions.

Figure 4:
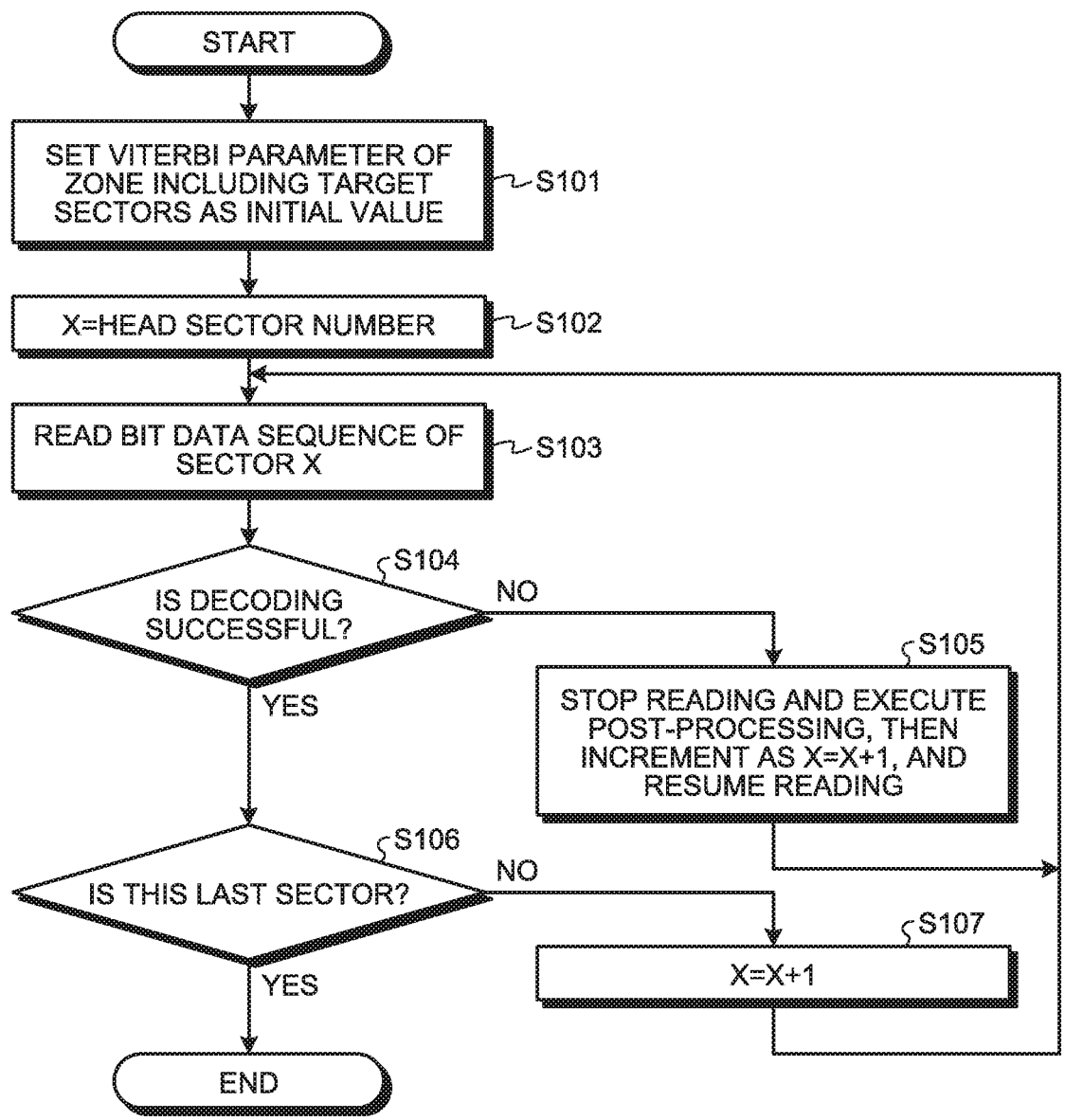
FIG. 4 is a flowchart illustrating an example of normal reading operation of the magnetic disk device according to the first embodiment.

FIG. 4 is a flowchart illustrating an example of normal reading operation of the magnetic disk device 1 according to the first embodiment.

First, in the magnetic disk device 1, the MPU 20 sets the initial value of the Viterbi parameter, for example (S101). Here, as an example, the value of the Viterbi parameter is managed individually for each of zones. The magnetic disk device 1 sets a value corresponding to a zone including a reading target sector group, as an initial value.

A zone is a group of a plurality of continuous tracks. The value of the Viterbi parameter for each of zones is optimized in the manufacturing process by using a plurality of sectors on a certain track in the corresponding zone, for example.

The unit for managing the value of the Viterbi parameter is not limited to a zone. The value set as the initial value is not limited to the above. The method of calculating the Viterbi parameter value for each of zones is not limited to the above.

Subsequently, the magnetic disk device 1 selects the head sector number of the reading target sector group (S102). The selected number is defined as X.

Subsequently, the magnetic disk device 1 executes reading of the bit data sequence of the sector X (S203). At the time of reading, the RDC 18 executes decoding. Learning and updating of the Viterbi parameters are executed at the time of decoding.

In a case where the decoding is not successful (S104: No), the magnetic disk device 1 stops the read processing and executes post-processing (S105). After completion of the post-processing in S105, the magnetic disk device 1 increments the value of X by 1, resumes reading, and executes the processing of S103.

Post-processing is implemented in any configuration. In one example, the RDC 18 reports a decoding failure to the HDC 19. The HDC 19 stops reading in response to the report of the decoding failure and reports an error to the host 2.

In S105, the HDC 19 may wait for an instruction to read the next sector from the host 2, and may increment X and execute S103 after receiving the instruction. Alternatively, the HDC 19 may increment X and execute S103 without waiting for an instruction from the host 2.

In a case where the decoding is successful (S106: Yes), the magnetic disk device 1 determines whether the sector X is the last sector of the reading target sector group (S106). In a case where the sector X is not the last sector (S106: No), the magnetic disk device 1 increments X by 1 (S107) and executes the processing of S103 again.

In a case where the sector X is the last sector (S106: Yes), the normal reading operation is completed.

In the normal reading operation described above, Viterbi parameter learning is executed for each of sectors. The Viterbi parameter that has already been learned by reading each of sectors is taken over when the next sector is read, and further learning is executed in the next reading.

For example, when a sector included in a certain zone (denoted as a first zone) is read and a sector included in another zone (denoted as a second zone) is read immediately after the sector of the first zone, a value of the Viterbi parameter for the second zone is set without taking over the Viterbi parameter. Note that the Viterbi parameter may be taken over even in such a case.

Figure 5:
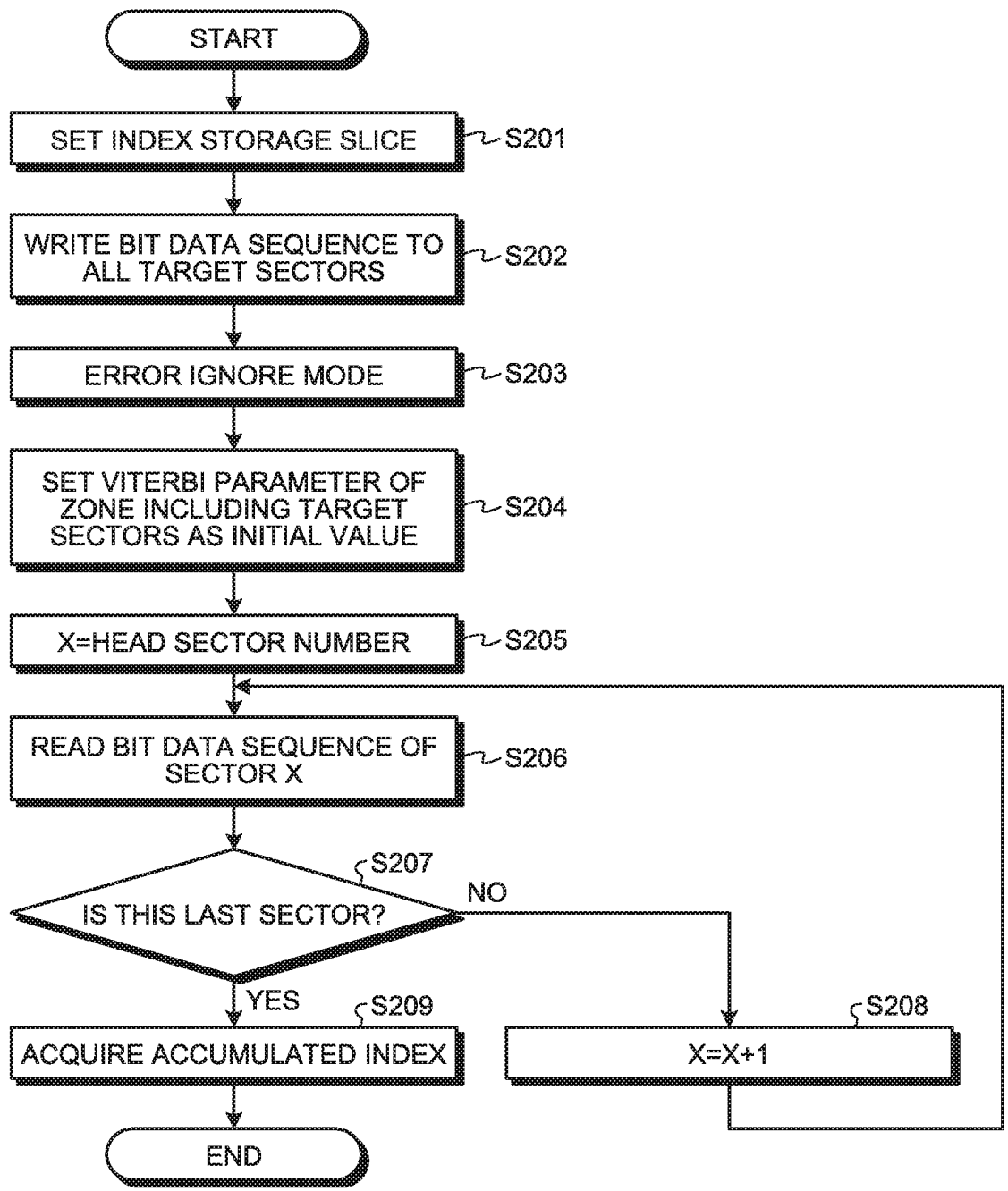
FIG. 5 is a flowchart illustrating an example of the read/write quality measurement operation of the magnetic disk device according to the first embodiment.

FIG. 5 is a flowchart illustrating an example of the read/write quality measurement operation of the magnetic disk device 1 according to the first embodiment.

First, the MPU 20 sets an index storage slice to be used for determination of index acquisition timing (S201). Subsequently, the magnetic disk device 1 writes a bit data sequence to a sector group that is a target of read/write quality measurement (S202). In S202, the acquisition circuit 106 may store, in a predetermined register or the like, the bit data sequence before it is written.

Subsequently, the MPU 20 sets the operation mode of the magnetic disk device 1 to an error ignore mode (S203). The error ignore mode is an operation mode in which reading will not be stopped even when a decoding failure is reported.

Subsequently, in the magnetic disk device 1, for example, the MPU 20 sets an initial value of the Viterbi parameter (S204). Here, as an example, the value of the Viterbi parameter is managed individually for each of zones. The magnetic disk device 1 sets a value corresponding to a zone including a sector group of a target of the read/write quality measurement, as an initial value. Similarly to S101, the initial value setting method is not limited to this.

Subsequently, the magnetic disk device 1 selects the head sector number of the reading target sector group (S205). The selected number is defined as X.

Subsequently, the magnetic disk device 1 reads the bit data sequence of the sector X (S206). At the time of reading, the RDC 18 executes decoding. Learning and updating of the Viterbi parameter are executed at the time of decoding. In addition, when the number of times of executions of the decoding becomes equal to the index storage slice, the acquisition circuit 106 acquires the index.

Subsequently, the magnetic disk device 1 determines whether the sector X is the last sector in the sector group that is the target of the read/write quality measurement (S207). In a case where the sector X is not the last sector (S207: No), the magnetic disk device 1 increments X by 1 (S208) and executes the processing of S206 again.

In a case where the sector X is the last sector (S207: Yes), the MPU 20 acquires the index accumulated in the index storage circuit 107 (S209). Execution of S209 completes the read/write quality measurement operation.

In the read operation at the read/write quality measurement, Viterbi parameter learning is executed for each sector. The Viterbi parameter that has already been learned by reading each of the sectors is taken over when the next sector is read, and further learning is executed in the next reading.

For example, when a sector included in a certain zone (denoted as a first zone) is read and a sector included in another zone (denoted as a second zone) is read immediately after the sector of the first zone, a value of the Viterbi parameter for the second zone is set without taking over the Viterbi parameter. Note that the Viterbi parameters may be taken over even in such a case.

Figure 6:
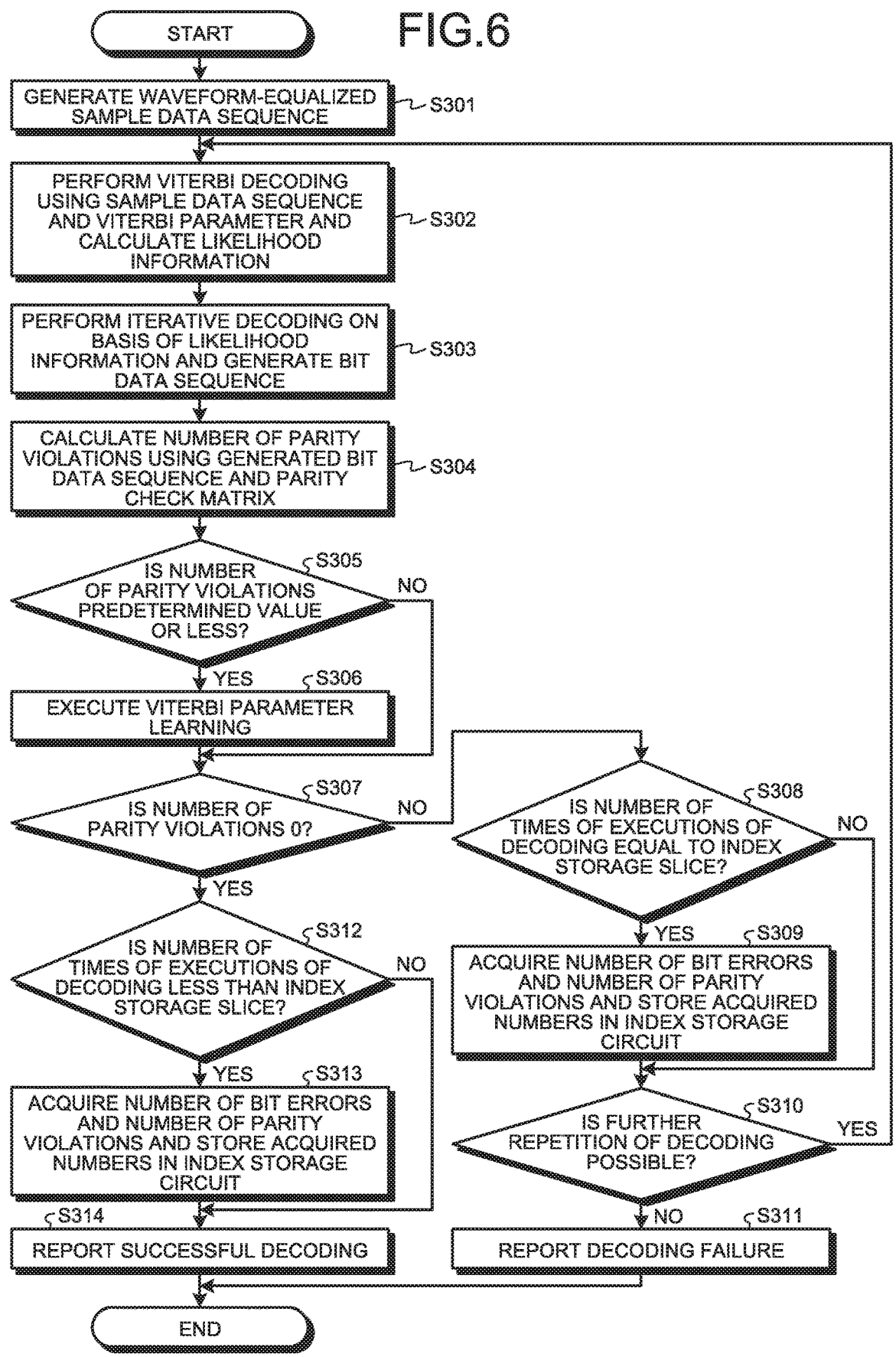
FIG. 6 is a flowchart illustrating an example of operation of the RDC according to the first embodiment executed in a single reading at read/write quality measurement.

FIG. 6 is a flowchart illustrating an example of operation of the RDC 18 according to the first embodiment executed in a single reading (specifically, the processing of S206) at the read/write quality measurement.

First, the FIR filter 100 generates a waveform-equalized sample data sequence (S301). The Viterbi decoder 101 performs Viterbi decoding using the sample data sequence and the Viterbi parameter which is provided by the Viterbi parameter control circuit 104, and calculates likelihood information (S302).

Following S302, the iterative decoder 102 performs iterative decoding on the basis of the likelihood information obtained in S302, and generates a bit data sequence (S303). The iterative decoder 102 next calculates the number of parity violations using the generated bit data sequence and the parity check matrix (S304).

Subsequently, the decoding control circuit 103 determines whether the number of parity violations obtained in S304 is a predetermined value or less (S305). The predetermined value may be defined by any method.

In a case where it is determined that the number of parity violations is a predetermined value or less (S305: Yes), the decoding control circuit 103 instructs the Viterbi parameter control circuit 104 to execute Viterbi parameter learning, and then, the Viterbi parameter control circuit 104 executes the Viterbi parameter learning in response to the instruction (S306).

In S306, the Viterbi parameter control circuit 104 executes the Viterbi parameter learning on the basis of a relationship between the sample data sequence output from the FIR filter 100 in S301 and the bit data sequence generated in S303. In a case where the value obtained by the learning is different from the current setting value of the Viterbi parameter, the Viterbi parameter control circuit 104 updates the set value of the Viterbi parameter to the value obtained by the learning.

In a case where it is determined that the number of parity violations is not a predetermined value or less (S305: No), the processing of S306 will be skipped. Skipping the processing of S306 in a case where the number of parity violations is not a predetermined value or less makes it possible to execute the Viterbi parameter learning at a point where the number of bit errors included in the bit data sequence has decreased to some extent.

After processing of S306, or in a case where it is determined that the number of parity violations is not a predetermined value or less (S305: No), the decoding control circuit 103 determines whether the number of parity violations is 0 (S307).

In a case where it is determined that the number of parity violations is not 0 (S307: No), the number-of-times determination circuit 105 determines whether the number of times of executions of the decoding, that is, the number of times of executions of the Viterbi decoding and the iterative decoding in pair is equal to the index storage slice (S308). In a case where it is determined that the number of times of executions of the decoding is equal to the index storage slice (S308: Yes), the acquisition circuit 106 acquires the number of bit errors included in the bit data sequence and the number of parity violations, and stores the acquired numbers in the index storage circuit 107 (S309). Here, as an example, the acquisition circuit 106 is assumed to accumulate each of the number of bit errors and the number of parity violations, but does not have to accumulate each of the number of bit errors and the number of parity violations.

Here, the acquisition circuit 106 acquires both the number of bit errors and the number of parity violations as the indexes, but the indexes are not limited to these. The acquisition circuit 106 may acquire one of the number of bit errors and the number of parity violations alone as the index.

The acquisition circuit 106 can acquire the number of bit errors by comparing the bit data sequence generated in S303 with the bit data sequence which is obtained before being written to the magnetic disk 10 and held in the register in S202. Note that the method of acquiring the number of bit errors is not limited to this.

In a case where it is determined that the number of times of executions of the decoding is not equal to the index storage slice (S308: No), the processing of S309 is skipped.

After processing of S309 or in a case where it is determined that the number of times of executions of decoding is not equal to the index storage slice (S308: No), the decoding control circuit 103 determines whether a further repetition of the decoding is possible (S310).

For example, executing continuous reading of a plurality of sectors would require execution of reading of the plurality of sectors without delay. Accordingly, the time required for decoding one sector is to be limited. For example, in a case where there is still time for further decoding (Viterbi decoding and iterative decoding in pair), it is determined that a further repetition of the decoding is possible. In a case where there is no time left for further decoding (Viterbi decoding and iterative decoding in pair), it is determined that a further repetition of the decoding is not possible. The method for determining whether the repetition of the decoding is possible is not limited to this.

In a case where it is determined that a further repetition of the decoding is not possible (S310: No), the decoding control circuit 103 reports a decoding failure to the MPU 20, for example (S311), so as to complete operation executed in a single read at the read/write quality measurement.

In a case where it is determined that a further repetition of the decoding is possible (S310: Yes), the processing of S302 will be executed again. When the processing of S302 is executed again, the Viterbi decoder 101 can use, in S302, logarithm likelihood information generated in the decoding executed immediately before, as prior information. This enables the Viterbi decoder 101 to obtain, by calculation, likelihood information that is improved compared to the previous Viterbi decoding.

In a case where it is determined in the determination processing of S307 that the number of parity violations is 0 (S307: Yes), the iterative decoding can be estimated to be successful. In this case, the number-of-times determination circuit 105 determines whether the number of times of executions of the decoding is less than the index storage slice (S312).

In a case where it is determined that the number of times of executions of decoding is less than the index storage slice (S312: Yes), the acquisition circuit 106 acquires the number of bit errors included in the bit data sequence and the number of parity violations, and stores the acquired numbers in the index storage circuit 107 (S313). Here, as an example, the acquisition circuit 106 is assumed to accumulate each of the number of bit errors and the number of parity violations, but does not have to accumulate each of the number of bit errors and the number of parity violations.

In S313, similarly to S309, the acquisition circuit 106 may acquire one of the number of bit errors and the number of parity violations alone, as the index. In addition, the acquisition circuit 106 can acquire the number of bit errors by comparing the bit data sequence generated in S303 with the bit data sequence that is obtained before being written to the magnetic disk 10 and held in the register in S202. Note that the method of acquiring the number of bit errors is not limited to this.

In a case where it is determined that the number of times of executions of the decoding is not less than the index storage slice (S312: No), the processing of S313 will be skipped.

After the processing of S313 or in a case where it is determined that the number of times of executions of the decoding is not less than the index storage slice (S312: No), the decoding control circuit 103 reports the decoding success to the MPU 20, for example (S314), so as to complete operation executed in a single read at the read/write quality measurement.

In the operation illustrated in FIG. 5, a series of operations illustrated in FIG. 6 is executed for each of sectors constituting the sector group that is a target of the read/write quality measurement. The series of operations illustrated in FIG. 6 is executed for each of the sectors, and the indexes acquired for the respective sectors are accumulated in the index storage circuit 107. The index for each sector of the sector group that is a target of the read/write quality measurement is accumulated in the index storage circuit 107, and the accumulated index is acquired by the MPU 20 in the processing of S209.

The MPU 20 can provide the accumulated index for the sectors to optimize the read/write conditions. The optimization of the read/write conditions may include any processing.

For example, the MPU 20 can adjust a write current on the basis of one or more indexes. The MPU 20 can adjust recording density on the basis of one or more indexes. The recording density may be Tracks Per Inch (TPI), Bits Per Inch (BPI), or both of these.

Note that the series of operations illustrated in FIG. 6 may also be executed in normal reading. That is, the RDC 18 may acquire the index even in normal reading. The MPU 20 does not have to acquire the index acquired by the RDC 18 in normal reading.

As described above, according to the first embodiment, the Viterbi decoder 101 as the first decoding circuit calculates likelihood information by executing Viterbi decoding using the Viterbi parameter, which is a parameter for normalizing the branch metric, on the sample data sequence. The iterative decoder 102 as the second decoding circuit generates a bit data sequence by iterative decoding using the likelihood information, and executes a check using a parity check matrix on the bit data sequence. The decoding control circuit 103 and the Viterbi parameter control circuit 104 as the control circuit update the Viterbi parameter in accordance with the check result (that is, the number of parity violations) obtained at each of executions of decoding by the Viterbi decoder 101 and the iterative decoder 102. The number-of-times determination circuit 105 as the determination circuit determines whether the number of times of executions of the decoding is equal to the index storage slice (first value). The acquisition circuit 106 acquires numerical information corresponding to the number of bit errors included in the bit data sequence obtained when the number of times of executions of the decoding is equal to the index storage slice, and stores the acquired numerical information in the index storage circuit 107 as the storage circuit. Examples of the numerical information include the number of bit errors included in the bit data sequence obtained when the number of times of executions of the decoding is equal to the index storage slice or the number of parity violations obtained when the number of times of executions of the decoding is equal to the index storage slice.

A technique to be compared with the first embodiment would be a technique described below (denoted as a first comparative example). In the first comparative example, the repetition of Viterbi decoding and iterative decoding in pair is prohibited, thereby causing decoding to fail intentionally. In a case where the decoding fails, the number of parity violations or the number of error bits included in the bit data sequence at that time is acquired as the index.

However, according to the first comparative example, the Viterbi parameter learning is not executed because repetition of the Viterbi decoding and iterative decoding in pair is prohibited. That is, according to the first comparative example, since the index is acquired under different conditions from normal reading in terms of the Viterbi parameter, the value obtained as the index can hardly be numerical information that is highly correlated with the read/write quality.

Another technique compared with the first embodiment would be a technique described below (denoted as a second comparative example). In the second comparative example, the normal reading is first executed on the target sector, and learning of Viterbi parameters is performed at the time of the reading. Thereafter, reading is executed on the target sector in a state where the repetition of Viterbi decoding and iterative decoding in pair is prohibited. This intentionally causes decoding to fail. In a case where the decoding fails, the number of parity violations or the number of error bits included in the bit data sequence at that time is acquired as an index.

According to the second comparative example, the reading for acquiring the index is executed after the learning of the Viterbi parameter is executed by the normal reading. This makes it possible to acquire the index under conditions similar to those for the normal reading. However, according to the second comparative example, the index acquisition is executed after execution of the normal reading, and thus, the time required for the index acquisition increases.

According to the first embodiment, with the configuration described above, it is possible to acquire the index without prohibiting repetition of Viterbi decoding and iterative decoding in pair. Therefore, for example, sequentially executing reading of a plurality of sectors makes it possible to acquire the index while performing reading using the learned parameter. This makes it possible to acquire, as the index, numerical information having a higher correlation with the read/write quality than in the case of the first comparative example. In addition, compared to the second comparative example, it is possible to reduce the time required for acquiring the index per sector. That is, usability is improved.

In the above description, when an index corresponding to the read/write quality is measured, reading of a certain sector is executed, and thereafter, the value of the Viterbi parameter having been obtained after learning by the reading of the sector is used as an initial value of the Viterbi parameter when reading of the next sector is executed.

Using the value of the learned Viterbi parameter at reading of the next sector in such operation is the same as in the case of the normal reading in the embodiment. The index corresponding to the read/write quality can be acquired under the same conditions as the normal reading with respect to the Viterbi parameter, making it possible to acquire a value having a higher correlation with the read/write quality, as the index.

Furthermore, according to the above operation, at reading from the second and subsequent sectors, it is possible to greatly reduce the number of times of executions of the decoding required for leading the number of parity violations to a predetermined value (the predetermined value in the processing of S305 in FIG. 6) or less. This makes it possible to reduce the time required for acquiring the index per sector compared to the second comparative example.

The magnetic disk 10 includes a plurality of storage regions, each of which being a unit of normal reading and reading for the read/write quality measurement. In the example described above, each of the plurality of storage regions is a sector. Each of the plurality of storage regions is not limited to a sector.

Second Embodiment

When the write current is insufficient, for example, the number of bit errors increases in a specific data pattern such as "00100", in which only a small number of bits are inverted part way through the continuation of the same value. Therefore, measuring the number of bit errors for each of data patterns makes it possible to provide the measurement result to the adjustment of the write current. Note that the specific data pattern to be explained here is different from the data pattern used for calculating a branch metric in Viterbi decoding.

The magnetic disk device 1 of the second embodiment is different from that of the first embodiment in that an RDC 18a is provided instead of the RDC 18. In the following description of the second embodiment, the same constituent elements as those in the first embodiment are denoted by the same names and reference numerals as those in the first embodiment, and detailed description will be omitted.

Figure 7:
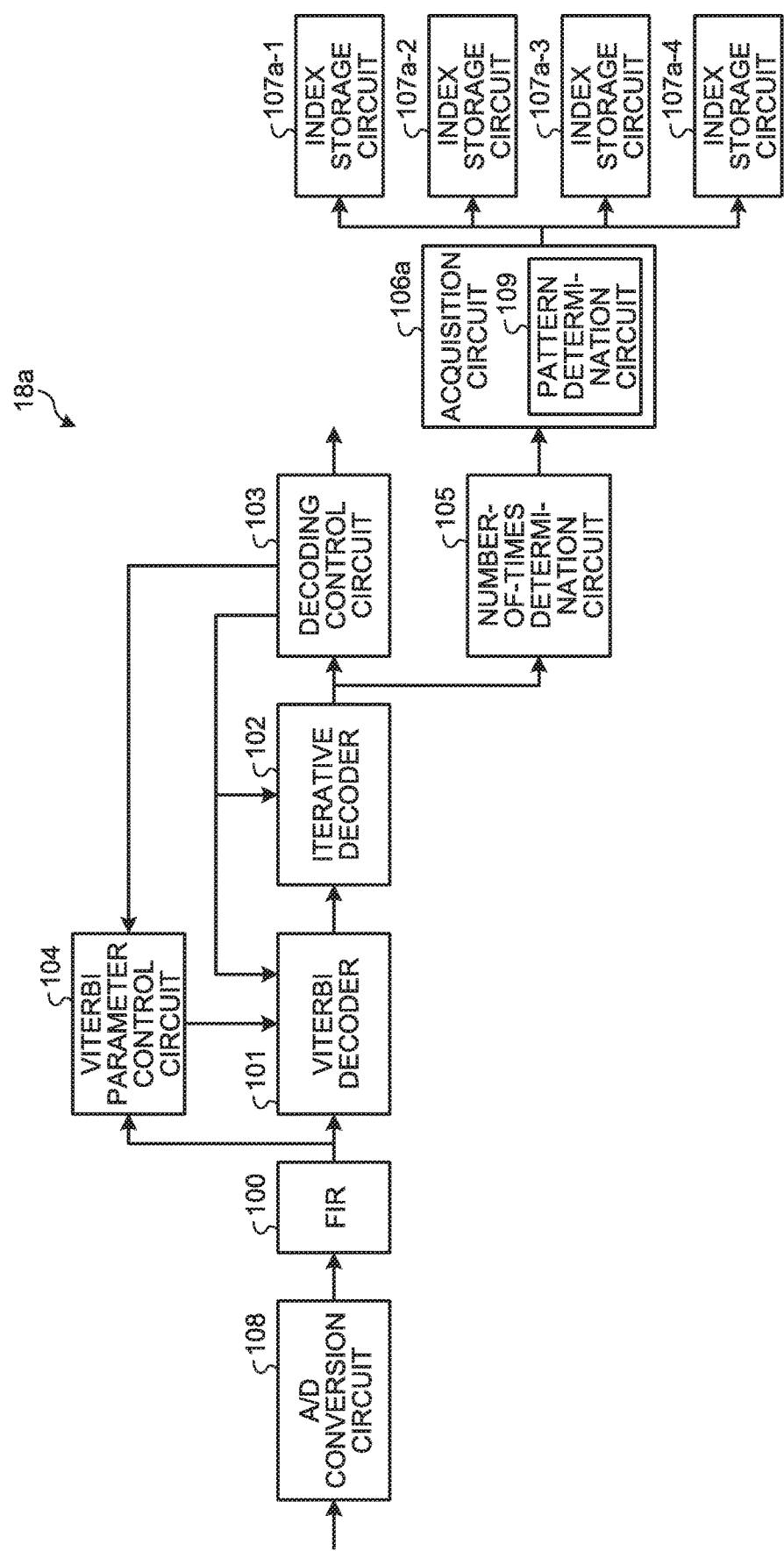
FIG. 7 is a schematic diagram illustrating an example of a detailed configuration of an RDC according to a second embodiment.

FIG. 7 is a schematic diagram illustrating an example of a detailed configuration of the RDC 18a according to the second embodiment. The RDC 18a includes the A/D conversion circuit 108, the FIR filter 100, the Viterbi decoder 101, the iterative decoder 102, the decoding control circuit 103, the Viterbi parameter control circuit 104, the number-of-times determination circuit 105, an acquisition circuit 106a, and a plurality of index storage circuits 107a.

Here, four index storage circuits 107a-1, 107a-2, 107a-3, and 107a-4 are provided as an example of the plurality of index storage circuits 107a. The number of index storage circuits 107a provided in the RDC 18a is not limited to four. The four index storage circuits 107a-1, 107a-2, 107a-3, and 107a-4 include, for example, small-scale memory devices and registers. Note that the plurality of index storage circuits 107a is another example of the storage circuit.

The acquisition circuit 106a includes a pattern determination circuit 109. One or more data patterns such as "00100" described above are preliminarily set in the pattern determination circuit 109, for example. The pattern determination circuit 109 detects a preliminarily set specific data pattern from the bit data sequence before being written to the magnetic disk 10. The acquisition circuit 106a acquires the number of bit errors for each of the data patterns detected by the pattern determination circuit 109.

For example, it is assumed that a data pattern "00100" and a data pattern "11100" are preliminarily set in the pattern determination circuit 109. In a case where the bit data sequence generated by the iterative decoder 102 includes the data pattern "00100" in five locations and the data pattern "11100" in seven locations, and where a total of three bit errors occur with respect to the five data patterns "00100" while a total of one bit error occurs with respect to seven data patterns "11100", the acquisition circuit 106a acquires "3" as the number of bit errors related to the data pattern "00100" and acquires "1" as the number of bit errors related to the data pattern "11100".

One or more of the data patterns set in the pattern determination circuit 109 are associated with one of the four index storage circuits 107a-1, 107a-2, 107a-3, and 107a-4. The correspondence between the data pattern and the index storage circuit 107a may be one-to-one or may be a plurality to one. The acquisition circuit 106a stores the number of bit errors acquired for each of the data patterns in the corresponding index storage circuit 107a.

That is, in the second embodiment, the number of bit errors acquired for each of data patterns is acquired as the index. In addition to the number of bit errors acquired for each of data patterns, the index may include the number of bit errors included in the bit data sequence generated by the iterative decoder 102 or the number of parity violations calculated by the iterative decoder 102.

Figure 8:
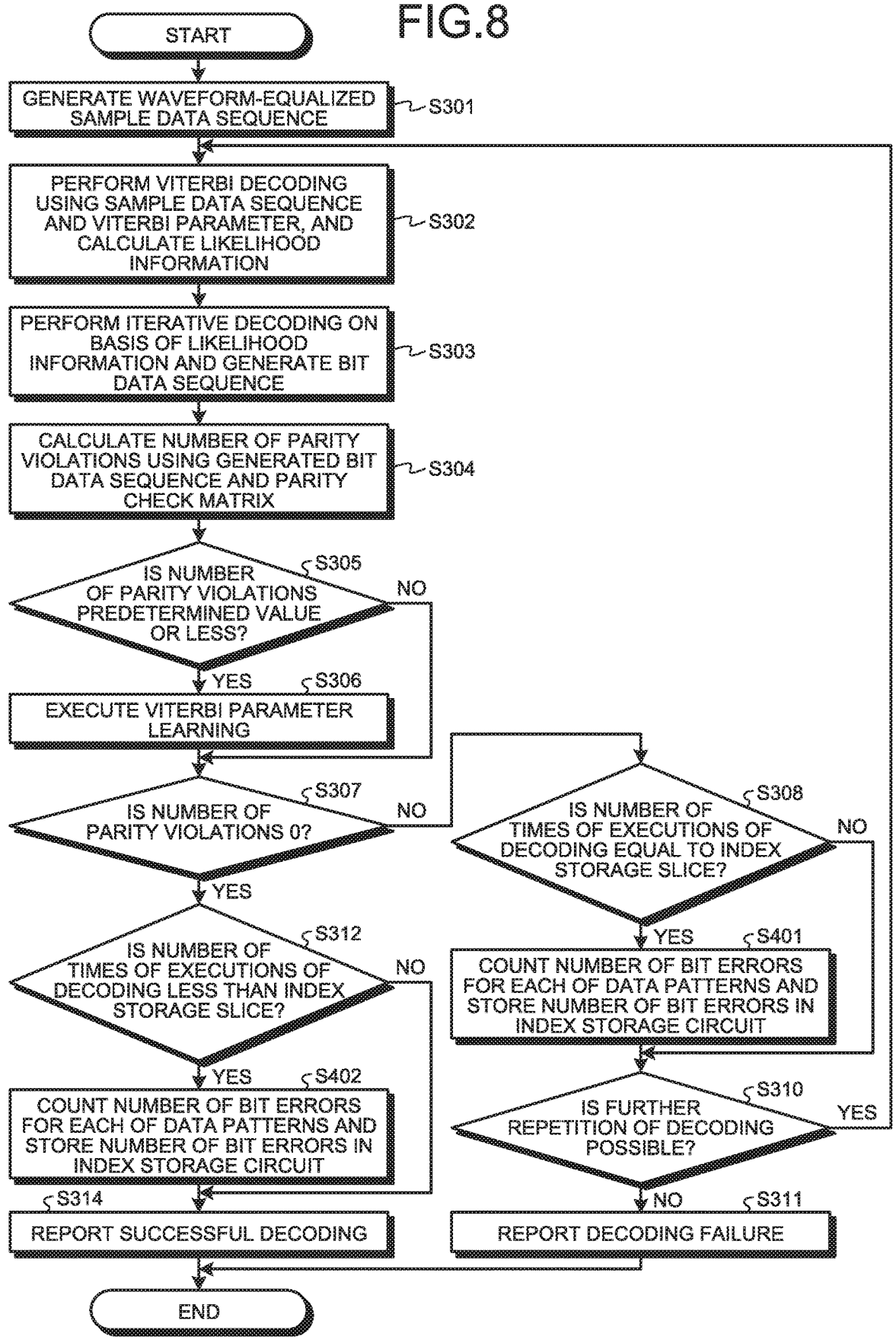
FIG. 8 is a flowchart illustrating an example of operation of the RDC according to the second embodiment executed in a single reading at read/write quality measurement.

FIG. 8 is a flowchart illustrating an example of operation of the RDC 18a of the second embodiment executed in a single reading at measurement of the read/write quality. As illustrated in FIG. 8, operation of the RDC 18a of the second embodiment differs from the operation of the RDC 18 of the first embodiment in that it includes S401 instead of the processing of S309 in FIG. 6, and includes S402 instead of the processing of S313 in FIG. 6. Here, the processing of S401 and the processing of S402 will be described, and description will be omitted for other processes.

Both the processing of S401 and the processing of S402 are processes for acquiring the indexes, in which the same operation is executed. Specifically, in the processing of S401 and S402, the pattern determination circuit 109 detects a preliminarily set specific data pattern from the bit data sequence before being written to the magnetic disk 10. The bit data sequence before being written to the magnetic disk 10 is preliminarily stored in a predetermined register, for example. The acquisition circuit 106a counts the number of bit errors for each of data patterns detected by the pattern determination circuit 109. The acquisition circuit 106a next stores the number of bit errors for each of data patterns in the corresponding index storage circuit 107a. Here, as an example, the acquisition circuit 106 accumulates the number of bit errors for each of data patterns. However, the acquisition circuit 106 does not have to accumulate the number of bit errors for each of data patterns.

Figure 9:
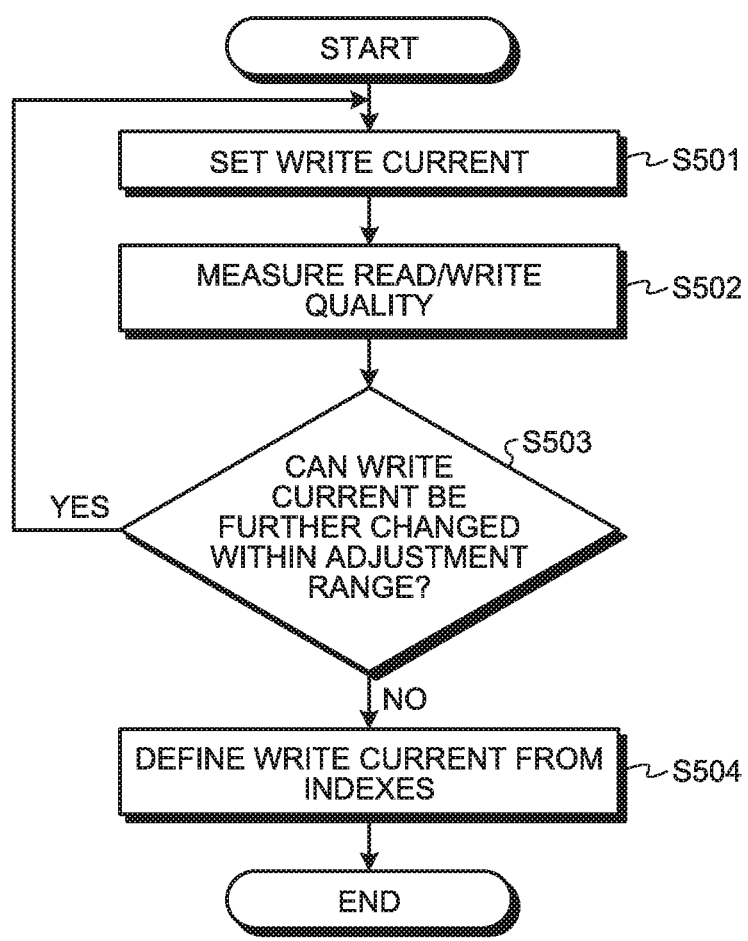
FIG. 9 is a flowchart illustrating an example of details of the write current adjustment operation executed by the magnetic disk device according to the second embodiment.

FIG. 9 is a flowchart illustrating an example of details of the write current adjustment operation executed by the magnetic disk device 1 according to the second embodiment.

For example, a write current settable value range (adjustment range) is preliminarily defined. The MPU 20 sets one value within the write current settable value range as a set value of the write current (S501). Subsequently, the read/write quality measurement is executed (S502).

In S502, a series of processing illustrated in FIG. 5 is executed. However, in S202, the write current set in S501 is used. Furthermore, at the time of a single reading (that is, the processing of S206), a series of processing illustrated in FIG. 8 is executed.

Subsequently, the MPU 20 determines whether the write current can be further changed within the adjustment range (S503). In this processing, it is determined whether a value that has not yet been set as the write current remains within the adjustment range. In a case where a value that has not yet been set as the write current remains within the adjustment range, the remaining value is determined as a value that can be set as the write current. In a case where it is determined that the write current can be further changed within the adjustment range (S503: Yes), the processing of S501 is executed again. In S501, a value not yet set as the write current is set as the write current.

In a case where there is no remaining value that has not yet been set as the write current within the adjustment range, it is determined that the write current cannot be further changed within the adjustment range. In a case where it is determined that the write current cannot be further changed within the adjustment range (S503: No), the MPU 20 selects one write current within a range of values in which the write current can be set on the basis of the number of bit errors counted for each of data patterns acquired every time the write current is set, and defines the selected write current as an adjusted write current (S504). The MPU 20 selects, within the range of values in which the write current can be set, a value at which the number of bit errors counted for each of data patterns is optimal, as the adjusted write current. S504 completes the series of processing for adjusting the write current.

In this manner, according to the second embodiment, one or more data patterns are preliminarily set, and the acquisition circuit 106a counts the number of bit errors for each of the data patterns included in a bit data sequence before being written to the magnetic disk 10. Subsequently, the acquisition circuit 106a stores the number of bit errors counted for each of the data patterns as the index in the index storage circuit 107a.

Insufficient write current may appear as deviation in the number of bit errors for each of data patterns. Therefore, adjusting the write current using the number of bit errors for each of data patterns obtained by the above configuration makes it possible to improve write current adjustment accuracy.

Third Embodiment

In a case where a plurality of pieces of bit data erroneously written due to insufficient write current is included, there might be a case, at repetitive execution of the Viterbi decoding and iterative decoding, where the decrease in the number of parity violations stops halfway and would not converge to 0. In the third embodiment, in order to enable determination as to whether the decrease in the number of parity violations stops halfway, a plurality of mutually different values (second values) are set as index storage slices. Every time the number of times of executions of decoding becomes equal to any of the index storage slices, the number of parity violations is acquired as the index.

The magnetic disk device 1 of the third embodiment is different from that of the first embodiment in that an RDC 18b is provided instead of the RDC 18. In the following description of the third embodiment, the same constituent elements as those in the first embodiment will be denoted by the same names and reference numerals as those in the first embodiment, and detailed description thereof will be omitted.

Figure 10:
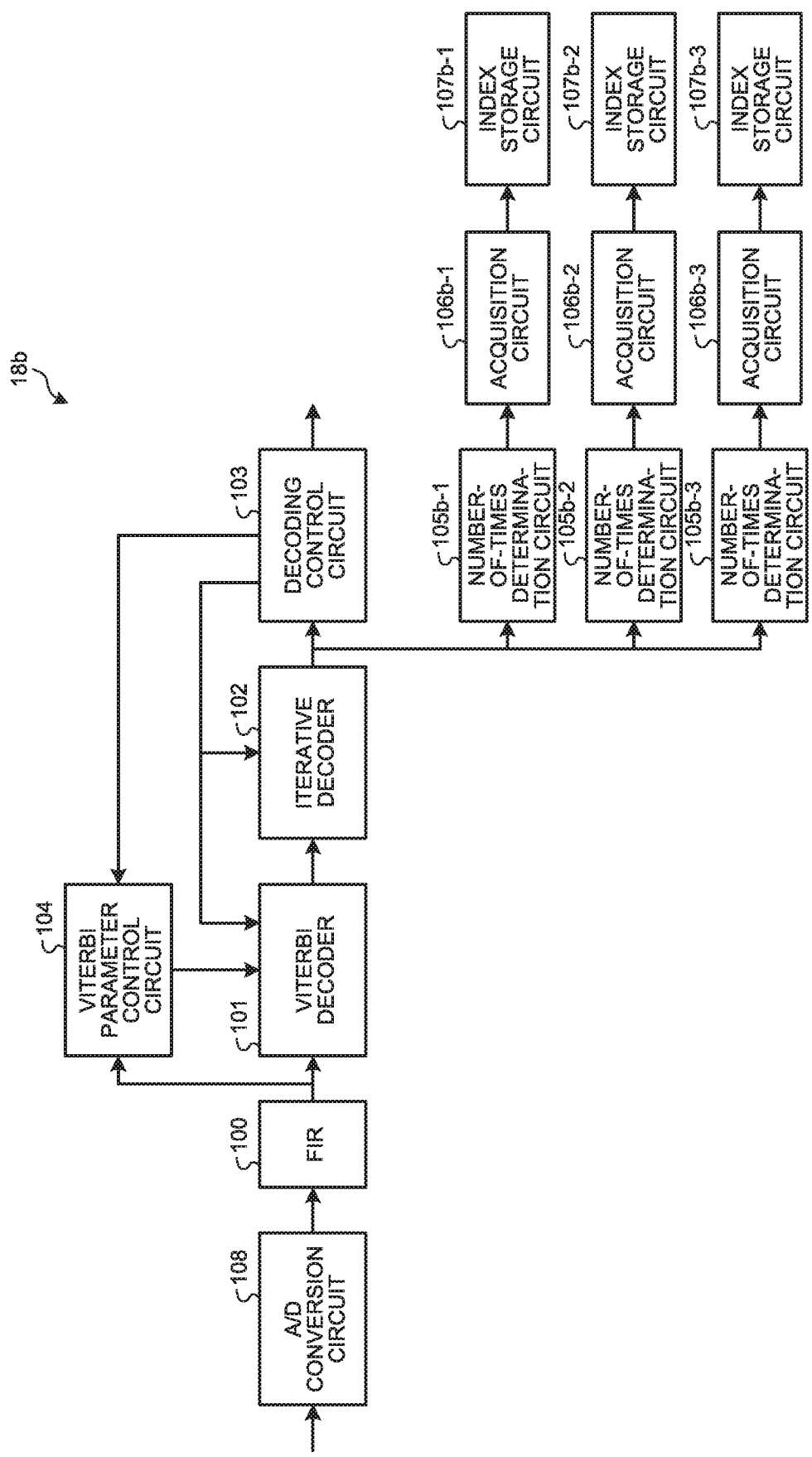
FIG. 10 is a schematic diagram illustrating an example of a detailed configuration of an RDC according to a third embodiment.

FIG. 10 is a schematic diagram illustrating an example of a detailed configuration of the RDC 18b according to a third embodiment. The RDC 18b includes the A/D conversion circuit 108, the FIR filter 100, the Viterbi decoder 101, the iterative decoder 102, the decoding control circuit 103, the Viterbi parameter control circuit 104, and a plurality of number-of-times determination circuits 105b. The RDC 18b further includes a plurality of acquisition circuits 106b and a plurality of index storage circuits 107b corresponding to the plurality of number-of-times determination circuits 105b.

The plurality of number-of-times determination circuits 105b are another example of the determination circuit. The plurality of acquisition circuits 106b are another example of the acquisition circuit. The plurality of index storage circuits 107b are still another example of the storage circuit.

Here, three number-of-times determination circuits 105b-1, 105b-2, and 105b-3 are provided as an example of the plurality of number-of-times determination circuits 105b. Note that the number of number-of-times determination circuits 105b provided in the RDC 18b is not limited to three. The three index storage circuits 107b-1, 107b-2, 107b-3, and 107b-4 include, for example, small-scale memory devices and registers.

As the plurality of acquisition circuits 106b, three acquisition circuits 106b-1, 106b-2, and 106b-3 are provided. In addition, three index storage circuits 107b-1, 107b-2, and 107b-3 are provided as the plurality of index storage circuits 107b.

A mutually different index storage slice is preliminarily set in each of the three number-of-times determination circuits 105b-1, 105b-2, and 105b-3. The number-of-times determination circuit 105b-1 determines whether the number of times of executions of the decoding is equal to the index storage slice set for the own circuit. In a case where the number of times of executions of the decoding is equal to the index storage slice set in the number-of-times determination circuit 105b-1, the acquisition circuit 106b-1 acquires the number of parity violations as an index indicating the read/write quality, and then stores the acquired number of parity violations in the index storage circuit 107b-1.

The number-of-times determination circuit 105b-2 determines whether the number of times of executions of the decoding is equal to the index storage slice set for the own circuit. In a case where the number of times of executions of the decoding is equal to the index storage slice set in the number-of-times determination circuit 105b-2, the acquisition circuit 106b-2 acquires the number of parity violations as an index indicating the read/write quality, and then stores the acquired number of parity violations in the index storage circuit 107b-2.

The number-of-times determination circuit 105b-2 determines whether the number of times of executions of the decoding is equal to the index storage slice set for the own circuit. In a case where the number of times of executions of the decoding is equal to the index storage slice set in the number-of-times determination circuit 105b-2, the acquisition circuit 106b-2 acquires the number of parity violations as an index indicating the read/write quality, and then stores the acquired number of parity violations in the index storage circuit 107b-2.

That is, in the third embodiment, a plurality of parity violation numbers acquired at different timings of the number of times of the decoding executions correspond to the index. Note that the index may further include the number of bit errors acquired at the timing when the number of parity violations is acquired.

Figure 11:
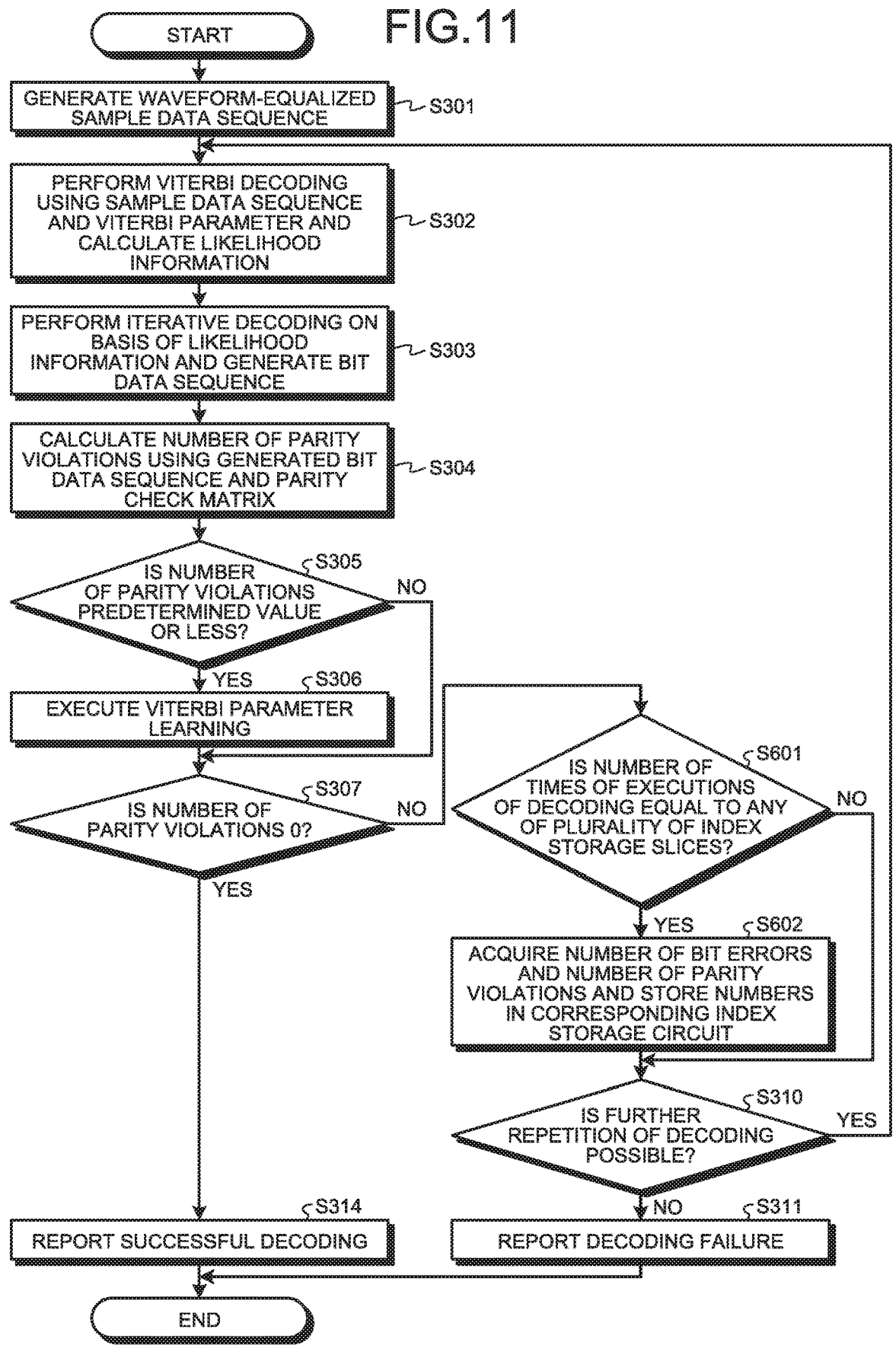
FIG. 11 is a flowchart illustrating an example of operation of the RDC according to the third embodiment executed in a single reading at read/write quality measurement.

FIG. 11 is a flowchart illustrating an example of operation of the RDC 18b according to the third embodiment executed in a single reading at measurement of the read/write quality. As illustrated in FIG. 11, operation of the RDC 18b of the third embodiment differs from the operation of the RDC 18 of the first embodiment in that it includes processing of S601 and S602 instead of the processing of S308 and S309 in FIG. 6, and omits processing of S312 and S313 in FIG. 6. Here, the processing of S601 and 602 will be described, and description will be omitted for other processes.

In the processing of S601, each of the number-of-times determination circuits 105b determines whether the number of times of executions of the decoding is equal to the index storage slice set for the own circuit, and whether the number of times of executions of the decoding is equal to any of the index storage slices is determined (S601).

In a case where it is determined that the number of times of executions of the decoding is equal to any of the index storage slices (S601, Yes), the acquisition circuit 106b, which corresponds to the number-of-times determination circuit 105b that has determined that the number of times of executions of decoding is equal to the index storage slice set for the own circuit, acquires the number of parity violations and stores it in the corresponding index storage circuit 107b (S602). In a case where it is determined that the number of times of executions of the decoding is not equal to any index storage slice (S601: No), the processing of S602 will be skipped.

With this processing, a plurality of parity violation numbers acquired at different timings of the number of times of the decoding executions are acquired as the indexes.

Note that the processing of FIG. 11 may be performed in normal reading. In normal reading, in a case where reading is successful, that is, in a case where the number of parity violations becomes 0 (S307: Yes), the decoding control circuit 103 transmits the bit data sequence generated in S303 to a subsequent processing circuit, as a decoded bit data sequence. In a case where the reading fails, that is, when decoding failure is reported to the MPU 20 (S311), for example, retry of reading is executed under the control of the MPU 20. A plurality of settings is prepared for the retry of reading. In the retry of reading, reading is retried a plurality of times under various settings until the reading is successful.

In a case where the decrease in the number of parity violations is stopped, it is possible to estimate inclusion of a plurality of pieces of bit data that have failed to be written due to insufficient write current. In this case, the retry of reading is executed using the setting to be selected in a case where there is bit data that has failed to be written due to insufficient write current, instead of the setting that is normally selected.

Figure 12:
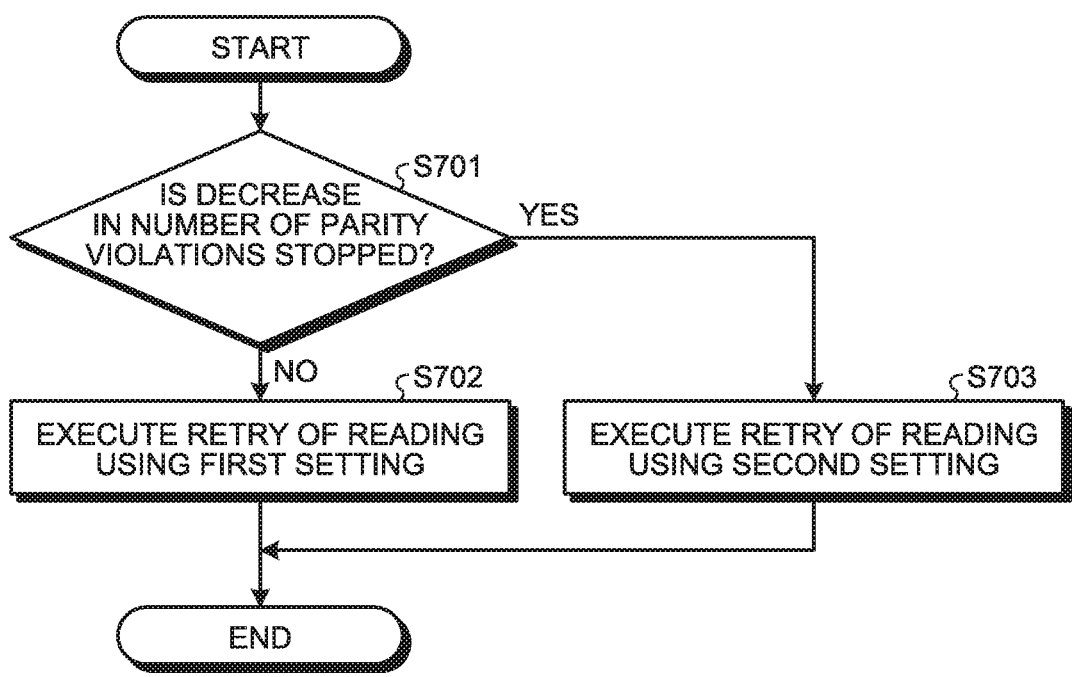
FIG. 12 is a flowchart illustrating an example of retry operation of reading according to the third embodiment.

FIG. 12 is a flowchart illustrating an example of a retry operation of reading according to the third embodiment.

When the MPU 20 acquires the number of parity violations obtained for each of index storage slices, the MPU 20 determines whether the decrease in the number of parity violations is stopped (S701).

For example, in a case where the number of parity violations is not 0 and the amount of decrease in the number of parity violations continues to be 0 as the number of times of executions of the decoding increases, the MPU 20 can determine that the decrease in the number of parity violations is stopped. In a case where the amount of decrease in the number of parity violations is one or more even when the number of times of executions of the decoding increases, the MPU 20 can determine that the decrease in the number of parity violations is not stopped. Note that the method of determining whether the decrease in the number of parity violations is stopped is not limited to this.

In a case where it is determined that the decrease in the number of parity violations is not stopped (S701: No), the MPU 20 controls the entire magnetic disk device 1 and executes reading using the normal setting (first setting) (S702). In a case where it is determined that the decrease in the number of parity violations is stopped (S701: Yes), the MPU 20 controls the entire magnetic disk device 1 and executes retry of reading using special setting (second setting), which is different from the normal setting, for a case where there is bit data that has failed to be written due to insufficient write current (S703). The processing in S702 or S703 completes the retry operation of reading.

In this manner, according to the third embodiment, the acquisition circuit 106*b* acquires the number of parity violations every time the number of times of executions of the decoding reaches the index storage slice.

This makes it possible to estimate whether there is, in a bit data sequence, bit data that has failed to be written due to insufficient write current.

Furthermore, as described with reference to FIG. 12, the MPU 20 can adjust the setting at the time of retry of reading on the basis of the number of parity violations acquired for each of index storage slices.

In a case where it is estimated that there is bit data that has failed to be written due to insufficient write current, retry of reading is performed using the setting, which is different from the normal setting, for a case where there is bit data that has failed to be written due to insufficient write current, making it possible to efficiently execute the retry of reading.

Fourth Embodiment

With insufficient write current, there might be a case where the variation in the number of bit errors for each of sectors in one track does not form a normal distribution due to the influence of partial medium sensitivity deviation or the like. In a case where an average value or a cumulative value of the indexes is used for each of tracks, since it is not clear whether the variation in the number of bit errors forms a normal distribution, there might be a case where an inappropriate setting is selected when optimizing the write conditions.

In order to determine whether the variation in the number of bit errors for each of sectors forms a normal distribution, an RDC (RDC 18*c*) of the fourth embodiment is configured to record a maximum value and a minimum value of the indexes acquired for each of sectors.

The magnetic disk device 1 of the fourth embodiment is different from that of the first embodiment in that an RDC 18*c* is provided instead of the RDC 18. In the following description of the fourth embodiment, the same constituent elements as those in the first embodiment will be denoted by the same names and reference numerals as those in the first embodiment, and detailed description thereof will be omitted.

Figure 13:
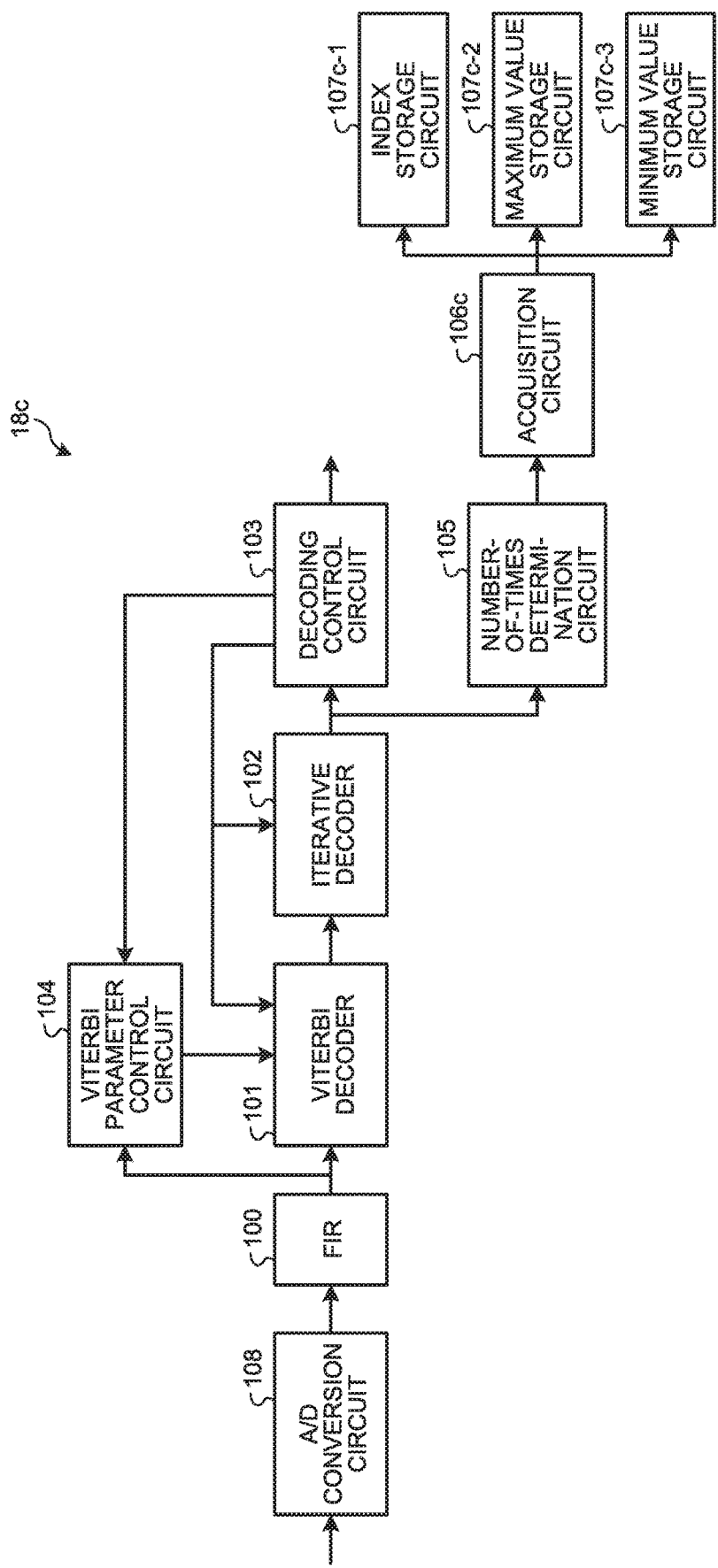
FIG. 13 is a schematic diagram illustrating an example of a detailed configuration of an RDC according to a fourth embodiment.

FIG. 13 is a schematic diagram illustrating an example of a detailed configuration of the RDC 18*c* according to the fourth embodiment. The RDC 18*c* includes the A/D conversion circuit 108, the FIR filter 100, the Viterbi decoder 101, the iterative decoder 102, the decoding control circuit 103, the Viterbi parameter control circuit 104, the number-of-times determination circuit 105, an acquisition circuit 106*c*, an index storage circuit 107*c*-1, a maximum value storage circuit 107*c*-2, and a minimum value storage circuit 107*c*-3.

The acquisition circuit 106*c* is still another example of the acquisition circuit. The index storage circuit 107*c*-1, the maximum value storage circuit 107*c*-2, and the minimum value storage circuit 107*c*-3 are still another example of the storage circuit.

The index storage circuit 107*c*-1, the maximum value storage circuit 107*c*-2, and the minimum value storage circuit 107*c*-3 include small-scale memory devices and registers.

In a case where the number of times of executions of the decoding is equal to the first value, the acquisition circuit 106*c* acquires an index indicating the read/write quality and stores the acquired index in the index storage circuit 107*c*-1. The index may be the number of bit errors or the number of parity violations. Note that the process in which the acquisition circuit 106*c* acquires the index and stores the acquired index in the index storage circuit 107*c*-1 is the same as the process in which the acquisition circuit 106 in the first embodiment acquires the index and stores the acquired index in the index storage circuit 107.

In the fourth embodiment, when the reading is sequentially executed on each of the plurality of sectors, the acquisition circuit 106*c* further stores, in the maximum storage circuit 107*c*-2, the maximum value of the plurality of indexes each of which is acquired from the different sector while storing the minimum value of the plurality of indexes in the minimum value storage circuit 107*c*-3.

Figure 14:
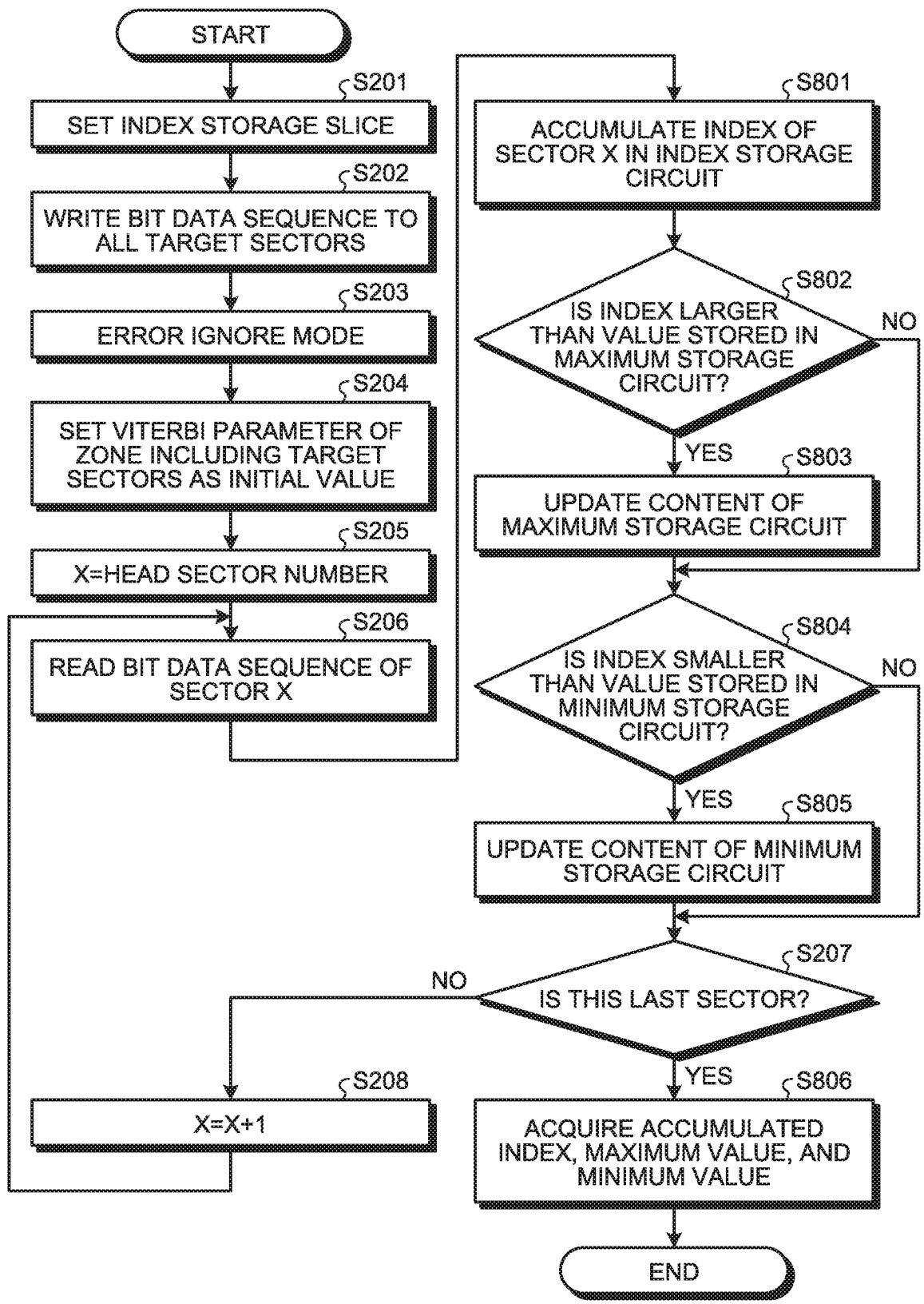
FIG. 14 is a flowchart illustrating an example of the read/write quality measurement operation of the magnetic disk device according to the fourth embodiment.

FIG. 14 is a flowchart illustrating an example of the read/write quality measurement operation of the magnetic disk device 1 according to the fourth embodiment.

In the fourth embodiment, first, the processing of S201 to S206 is executed similarly to the first embodiment. In the processing of S206, when the bit data sequence is read from the target sector, the RDC 18*c* executes the decoding. Learning and updating of the Viterbi parameters are executed at the time of the decoding. In addition, when the number of times of executions of the decoding becomes equal to the first value, the acquisition circuit 106c acquires the index. Subsequently, the acquisition circuit 106c accumulates the acquired index in the index storage circuit 107c-1 (S801).

Subsequent to the processing of S801, the acquisition circuit 106c determines whether the index acquired by the processing of S206 is larger than the value stored in the maximum value storage circuit 107c-2 (S802). Note that it is assumed, at a point of starting the processing of FIG. 14, that the maximum value storage circuit 107c-2 is reset to a predetermined sufficiently small value (for example, 0). In a case where it is determined that the index is larger than a value stored in the maximum value storage circuit 107c-2 (S802: Yes), the acquisition circuit 106c updates the content of the maximum value storage circuit 107c-2 with the index acquired in the processing of S206 (S803). In a case where it is determined that the index is not larger than the value stored in the maximum value storage circuit 107c-2 (S802: No), the processing of S803 will be skipped.

Subsequently, the acquisition circuit 106c determines whether the index acquired by the processing of S206 is smaller than a value stored in the minimum value storage circuit 107c-3 (S804). Note that it is assumed, at a point of starting the processing of FIG. 14, that the maximum value storage circuit 107c-2 is reset to a predetermined sufficiently large value (for example, all 1). In a case where it is determined that the index is smaller than a value stored in the minimum value storage circuit 107c-3 (S804: Yes), the acquisition circuit 106c updates the content of the minimum value storage circuit 107c-3 with the index acquired in the processing of S206 (S805). In a case where it is determined that the index is not smaller than the value stored in the minimum value storage circuit 107c-3 (S804: No), the processing of S805 will be skipped.

After the processing of S805 or when it is determined No in the determination processing of S804, the processing of S207 will be executed.

In a case where it is determined in S207 that the sector X is the last sector (S207: Yes), the magnetic disk device 1 acquires the index accumulated in the index storage circuit 107c-1, the value stored in the maximum value storage circuit 107c-2 (that is, the maximum value of the index), and the value stored in the minimum value storage circuit 107c-3 (that is, the minimum value of the index) (S806). Execution of this completes the read/write quality measurement operation.

FIG. 15 is a flowchart illustrating an example of details of the write current adjustment operation executed by the magnetic disk device 1 according to the fourth embodiment.

For example, a write current settable value range is preliminarily defined. The MPU 20 sets one value within the write current settable value range as a set value of the write current (S901). This process is the same as S501 of FIG. 9, for example.

Subsequently, the read/write quality measurement is executed (S902). In S902, a series of processing illustrated in FIG. 14 is executed. However, the write current set by S901 is used.

Subsequently, the MPU 20 determines whether the write current can be further changed within the adjustment range (S903). This process is similar to S503, for example. In a case where it is determined that the write current can be further changed within the adjustment range (S903: Yes), the processing of S901 is executed again.

In a case where it is determined that the write current cannot be further changed within the adjustment range (S903: No), the MPU 20 selects, within the write current settable value range, a value at which the best index (that is, the accumulated index) can be obtained, as the adjusted write current (S904). Note that the value of the write current at which the variation amount of the indexes, that is, a difference between the maximum value and the minimum value of the indexes, is a predetermined value or more is excluded.

For example, the variation amount of the indexes is measured both in a case where the variation of the indexes forms a normal distribution and in a case where the variation of the indexes does not form the normal distribution. In a case where the variation of the indexes does not form a normal distribution, the variation amount of the indexes tends to be greater than in the case where the variation of the indexes forms a normal distribution. A value corresponding to a boundary between the variation amount in a case where the variation of the indexes forms a normal distribution and the variation amount in a case where the variation of the indexes does not form the normal distribution is set as a predetermined value to be used in the determination processing of S904. The method for determining the predetermined value is not limited to this.

Processing of S904 completes the operation of adjusting the write current.

As described above, according to the fourth embodiment, the acquisition circuit 106c acquires the index for each of sectors, stores the maximum value of the index in the maximum value storage circuit 107c-2, and stores the minimum value of the index in the minimum value storage circuit 107c-3, individually.

Since this makes it possible to determine the state in which the write current is insufficient, the accuracy of the write condition optimization is improved.

The MPU 20 controls the write current on the basis of the maximum value and the minimum value of the indexes.

Since the write current can be controlled on the basis of whether the write current is insufficient, the accuracy of the write current optimization is improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a first decoding circuit that calculates likelihood information by executing Viterbi decoding using a parameter for normalizing a branch metric on a signal sequence read from a magnetic disk;
a second decoding circuit that generates a first bit data sequence by iterative decoding using the likelihood information, and executes a check using a parity check matrix on the first bit data sequence;
a control circuit that causes the first decoding circuit and the second decoding circuit to repeatedly execute decoding, and performs updating of the parameter in accordance with a result of the check obtained every time the decoding by the first decoding circuit and the second decoding circuit is executed;
a storage circuit;
a determination circuit that determines whether the number of times of executions of the decoding by the first decoding circuit and the second decoding circuit is equal to a first value; and
an acquisition circuit that acquires numerical information corresponding to the number of bit errors included in a second bit data sequence that is the first bit data sequence obtained when the number of times is equal to the first value, and stores the acquired numerical information in the storage circuit.

2. The magnetic disk device according to claim 1, wherein the numerical information is a result of the check acquired when the number of times reaches the first value.

3. The magnetic disk device according to claim 1, wherein the acquisition circuit counts the number of bit errors included in the second bit data sequence, and the numerical information is the number of bit errors counted.

4. The magnetic disk device according to claim 1, wherein the acquisition circuit is a circuit to which one or more data patterns are preliminarily set, and counts the number of bit errors included in the second bit data sequence for each of the data patterns, and the numerical information is the number of bit errors counted for each of the one or more data patterns.

5. The magnetic disk device according to claim 4, further comprising
a processor that controls a write current on the basis of the number of bit errors counted for each of the one or more data patterns.

6. The magnetic disk device according to claim 1, wherein the first value includes a plurality of mutually different second values,
the acquisition circuit acquires a result of the check every time the number of times reaches one of the plurality of second values, and
the numerical information is the result of the check acquired every time the number of times reaches each of the plurality of second values.

7. The magnetic disk device according to claim 6, further comprising
a processor that adjusts a setting in accordance with the result of the check at the time of retry of reading from the magnetic disk.

8. The magnetic disk device according to claim 1, wherein the magnetic disk includes a plurality of storage regions, and
the acquisition circuit acquires the numerical information for each of the storage regions out of the plurality of storage regions, and stores a maximum value and a minimum value of the numerical information, in the storage circuit.

9. The magnetic disk device according to claim 8, further comprising
a processor that controls a write condition on the basis of the maximum value and the minimum value.

10. The magnetic disk device according to claim 1, wherein the magnetic disk includes a plurality of storage regions,
the magnetic disk device executes reading of the signal sequence for each of storage regions, and
the first decoding circuit, using the parameter updated by the control circuit at the time of reading of a signal sequence of a first storage region out of the plurality of storage regions, executes initial Viterbi decoding on a waveform signal read from a second storage region after reading from the first storage region, the second storage region being different from the first storage region in the plurality of storage regions.

11. A method comprising:
calculating likelihood information by executing Viterbi decoding using a parameter for normalizing a branch metric on a signal sequence read from a magnetic disk;
generating a first bit data sequence by iterative decoding using the likelihood information, and executing a check using a parity check matrix on the first bit data sequence;
repeatedly executing decoding which includes calculating the likelihood information and executing the check;
updating the parameter in accordance with a result of the check obtained every time the decoding is executed;
determining whether the number of times of executions of the decoding is equal to a first value; and
acquiring numerical information corresponding to the number of bit errors included in a second bit data sequence that is the first bit data sequence obtained when the number of times is equal to the first value, and outputting the acquired numerical information.

12. The method according to claim 11, wherein the numerical information is a result of the check acquired when the number of times reaches the first value.

13. The method according to claim 11, further comprising counting the number of bit errors included in the second bit data sequence,
wherein the numerical information is the number of bit errors counted.

14. The method according to claim 11, further comprising counting the number of bit errors included in the second bit data sequence for each of one or more data patters,
wherein the numerical information is the number of bit errors counted for each of the one or more data patterns.

15. The method according to claim 14, further comprising controlling a write current on the basis of the number of bit errors counted for each of the one or more data patterns.

16. The method according to claim 11, wherein the first value includes a plurality of mutually different second values,
the method further comprising
acquiring a result of the check every time the number of times reaches one of the plurality of second values, and
the numerical information is the result of the check acquired every time the number of times reaches each of the plurality of second values.

17. The method according to claim 16, further comprising:
retrying reading from the magnetic disk; and
adjusting a setting in accordance with the result of the check at the time of the retry of the reading.

18. The method according to claim 11, wherein the magnetic disk includes a plurality of storage regions, and
the method further comprises
acquiring the numerical information for each of the storage regions out of the plurality of storage regions, and outputting a maximum value and a minimum value of the numerical information.

19. The method according to claim 18, further comprising controlling a write condition on the basis of the maximum value and the minimum value.

20. The method according to claim 11, wherein the magnetic disk includes a plurality of storage regions,
the method further comprises:
executing reading of the signal sequences for each of storage regions, and
using the parameter updated at the time of reading of the signal sequence of the first storage region out of the plurality of storage regions, and executing initial Viterbi decoding on a waveform signal read from a second storage region after reading from the first storage region, the second storage region being different from the first storage region in the plurality of storage regions.

* * * * *